(12) United States Patent
Jegarajan

(10) Patent No.: US 12,143,279 B1
(45) Date of Patent: Nov. 12, 2024

(54) SYSTEMS AND METHODS FOR MONITORING OF A NETWORK TOPOLOGY THROUGH GRAPHICAL USER INTERFACES

(71) Applicant: AVIATRIX SYSTEMS, INC., Santa Clara, CA (US)

(72) Inventor: Brighton Vino Jegarajan, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 17/880,523

(22) Filed: Aug. 3, 2022

(51) Int. Cl.
| | |
|---|---|
| *G06F 15/16* | (2006.01) |
| *H04L 41/12* | (2022.01) |
| *H04L 41/22* | (2022.01) |
| *H04L 43/045* | (2022.01) |
| *H04L 43/0864* | (2022.01) |

(52) U.S. Cl.
CPC ............ *H04L 41/22* (2013.01); *H04L 41/12* (2013.01); *H04L 43/045* (2013.01); *H04L 43/0864* (2013.01)

(58) Field of Classification Search
CPC ...... H04L 41/22; H04L 41/12; H04L 43/0864
See application file for complete search history.

(56) References Cited

U.S. PATENT DOCUMENTS

| | | | | |
|---|---|---|---|---|
| 5,768,552 | A * | 6/1998 | Jacoby | G06T 11/206 709/224 |
| 2015/0081887 | A1* | 3/2015 | Kalkunte | H04L 43/0852 709/224 |
| 2016/0337204 | A1* | 11/2016 | Dubey | G06F 3/04847 |
| 2018/0341394 | A1* | 11/2018 | Sangli | G06T 11/206 |
| 2023/0164059 | A1* | 5/2023 | Dawani | H04L 45/22 370/392 |

\* cited by examiner

*Primary Examiner* — Padma Mundur
(74) *Attorney, Agent, or Firm* — Winstead PC

(57) ABSTRACT

A distributed cloud computing system is disclosed that includes a controller configured to deploy a first gateway in a first cloud computing network and a second gateway in a second cloud computing network and logic that, upon execution by one or more processors, causes performance of operations including: obtaining metadata pertaining to each of the first gateway and the second gateway, obtaining network data, wherein a combination of the metadata and the network data identify each of a plurality of constructs, the communication paths between each construct, and in which cloud computing network each construct is deployed, generating an elliptical layout of a network topology graph illustrating a first segment including the first gateway representing deployment in the first cloud network and a second segment including the second gateway representing deployment in the second cloud computing network, and causing rendering of the visualization on a network device display screen.

14 Claims, 16 Drawing Sheets

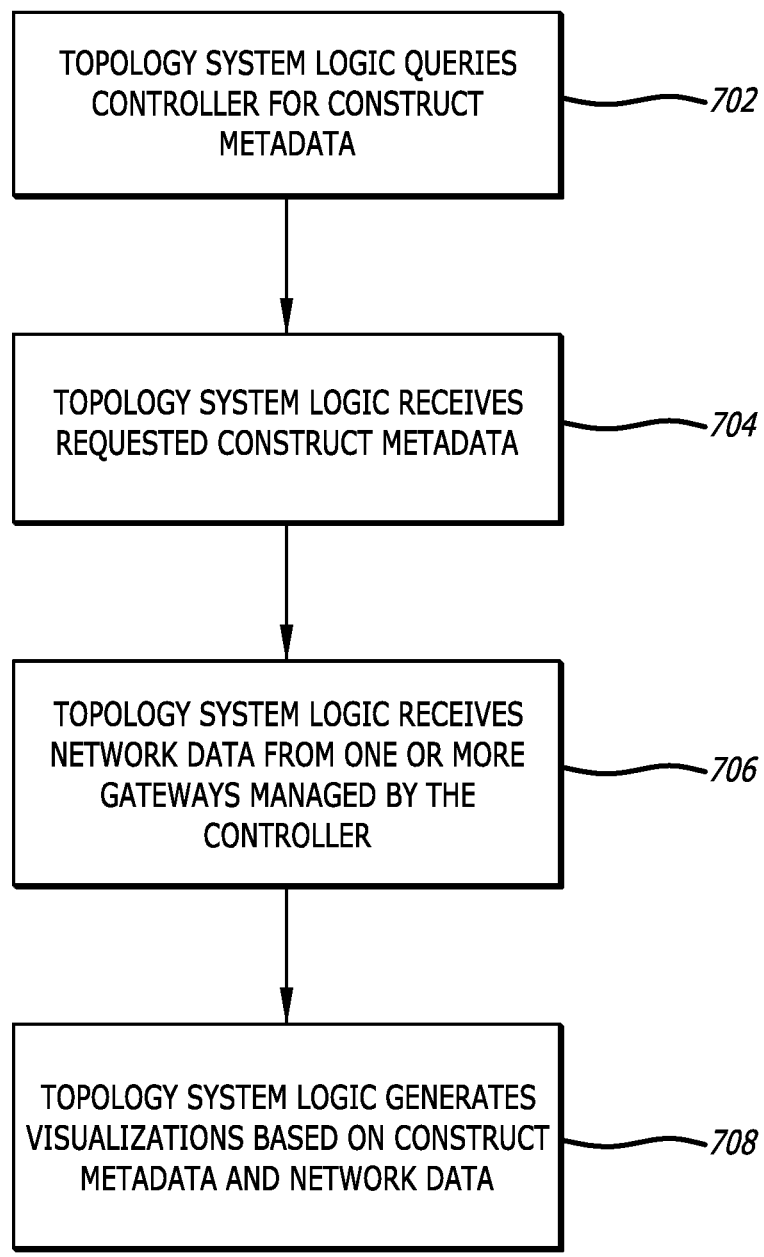

SYSTEMS AND METHODS FOR MONITORING OF A NETWORK TOPOLOGY THROUGH GRAPHICAL USER INTERFACES

FIELD

Embodiments of the disclosure relate to the field of cloud networking. More specifically, one embodiment of the disclosure is directed to a system and method for providing operational visibility of an enterprise network spanning a single public cloud network or a multiple public cloud networks and for providing a user with the ability to build and implement an enterprise network topology directly from a user interface providing such operational visibility.

GENERAL BACKGROUND

Until recently, businesses have relied on application software installed on one or more electronic devices residing in close proximity to its user (hereinafter, "on-premises electronic devices"). These on-premises electronic devices may correspond to an endpoint device (e.g., personal computer, cellular smartphone, netbook, etc.), a locally maintained mainframe, or even a local server for example. Depending on the size of the business, the purchase of the on-premises electronic devices and their corresponding software required a significant upfront capital outlay, along with significant ongoing operational costs to maintain the operability of these on-premises electronic devices. These operational costs may include the costs for deploying, managing, maintaining, upgrading, repairing and replacing these electronic devices.

Recently, more businesses and individuals have begun to rely on public cloud networks (hereinafter, "public cloud") for providing users to a variety of services, from word processing application functionality to network management. A "public cloud" is a fully virtualized environment with a multi-tenant architecture that provides tenants (i.e., users) with an ability to share computing and storage resources while, at the same time, retaining data isolation within each user's cloud account. The virtualized environment includes on-demand, cloud computing platforms that are provided by a collection of physical data centers, where each data center includes numerous servers hosted by the cloud provider. Examples of different types of public cloud networks may include, but is not limited or restricted to AMAZON WEB SERVICES®, MICROSOFT® AZURE®, GOOGLE CLOUD PLATFORM™ or ORACLE CLOUD™ for example.

This growing reliance on public cloud networks is due, in large part, to a number of costs saving advantages offered by this particular deployment. However, for many type of services, such as network management for example, network administrators face a number of challenges when business operations rely on operability of a single public cloud or operability of multiple public cloud networks. For instance, where the network deployed by an enterprise relies on multiple public cloud networks (hereinafter, "multi-cloud network"), network administrators have been unable to effectively troubleshoot connectivity issues that occur within the multi-cloud network. One reason for such ineffective troubleshooting is there are no conventional solutions available to administrators or users to visualize connectivity of its multi-cloud network deployment. Another reason is that cloud network providers permit the user with access to only a limited number of constructs, thereby controlling the type and amount of network information accessible by the user. As a result, the type or amount of network information is rarely sufficient to enable an administrator or user to quickly and effectively troubleshoot and correct network connectivity issues.

Likewise, there are no conventional solutions to visually monitor the exchange of traffic between network devices in different public cloud networks (multi-cloud network) and retain state information associated with network devices with the multi-cloud network to more quickly detect operational abnormalities that may suggest a cyberattack is in process or the health of the multi-cloud network is compromised. Further, what is needed is a system and methods of implementing the same that generate a graphical user interface that enable an administrator or other user to build a network topology graph in an intuitive manner where the system then automatically deploys constructs and applicable communication lines between such constructs thereby generating a fully operational network topology. Even further, what is needed is a graphical user interface that displays a network topology graph in a visually scalable manner, i.e., the visual display of icons representing constructs, edges, and other aspects of a network topology graph automatically adjusts to reduce visual clutter and provide for ease of viewing. Such systems, methods, and resultant graphical user interfaces should also provide for various monitoring, searching, and filtering capabilities directly from the graphical user interfaces.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 6-7 are flowcharts of exemplary methods of communications between the topology system logic, a controller and one or more gateways managed by the controller according to some embodiments.

DETAILED DESCRIPTION

Figure 1:
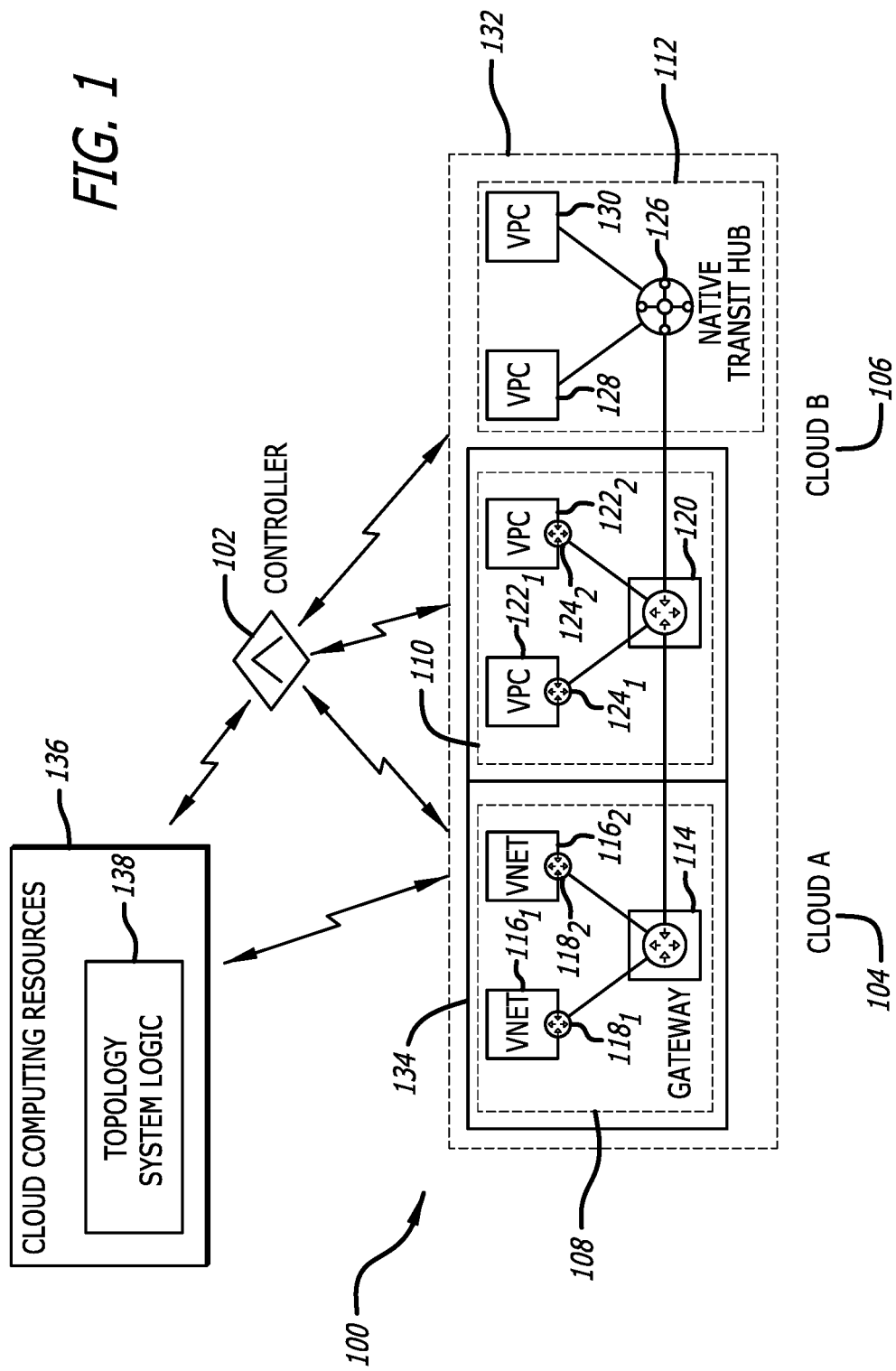
FIG. 1 is a diagram of an exemplary embodiment of a distributed cloud computing system including a controller managing constructs spanning multiple cloud networks according to some embodiments.

Embodiments of the disclosure are directed to a system configured to provide operational visibility of a network that spans one or more cloud computing environments. According to one embodiment, the system may include a software instance that is operating in one or more cloud computing resources and is configured to collect information and render a graphic user interface (GUI) that provides an interactive, visual rendering of the connectively between constructs of a network spanning multiple (two or more) cloud computing environments (hereinafter, a "multi-cloud computing environment or a "multi-cloud network"). In other embodiments, the system includes the software instance and a controller configured to manage constructs deployed in one or more cloud computing environments such as within a multi-cloud environment and communicate with the software instance.

As will be discussed below in further detail, the software instance may query the controller for information using one or more Application Programming Interface (API) calls to retrieve information stored by the controller detailing status information of each construct managed by the controller. The controller obtains such information from one or more gateways deployed within a multi-cloud network, where the gateway(s) are configured to transmit this information to the controller on a periodic (or aperiodic) basis. It should be understood that, as discussed herein, the term "multi-cloud networks" refers a plurality of cloud networks, where each cloud network may constitute a public cloud network provided by a different cloud computing environment resource provider (hereinafter, "cloud provider").

As is known in the art, a controller may be configured to program each gateway to control routing of network traffic such as by providing instructions to gateways as to how network traffic is routed among various gateways. As illustrative examples, the controller may instruct a gateway as to whether a virtual machine (VM) from one subnet work (hereinafter, "subnet") may communicate directly with a VM from another subnet, or how network traffic will flow from a source to a destination within the cloud computing environment managed by the controller. In addition, embodiments of the disclosure discuss instructions provided by the software instance to the controller, which are then transmitted to one or more gateways by the controller and include instructions to transmit network data from the gateway to a routable address (e.g., an Internet Protocol "IP" address, etc.) of the software instance.

Therefore, as a general embodiment, the software instance may query the controller for data indicating a status and metadata of each construct managed by the controller and also receive network data from one or more gateways. The software instance includes logic that, upon execution by one or more processors (e.g., being part of the cloud computing resources), generates various visualizations that are a combination of the construct status and metadata (collectively "construct metadata") and the network data. The visualizations may be interactive and provided to users such as network administrators, information technology (IT) professionals, or the like. Additionally, the visualizations may be configured to receive user input, which causes the logic of the software instance ("topology system logic") to alter the visualizations. As discussed below and illustrated in the accompanying drawings, the visualizations may include, but are not limited or restricted to, a dashboard view providing overall status and health of the network as well as specific network parameters; a dynamic topology mapping that provides a visual rendering of each construct and links that identify communications between the constructs; and a network flow visualization providing various illustrations detailing how network traffic is flowing (or has flowed) through the cloud computing environment managed by the controller. Each of the visualizations may provide data spanning a multi-cloud network.

In some embodiments, responsive to the user input, the topology system logic may generate tags for one or more of the constructs via the topology mapping visualization and store those tags for searching. For example, further user input may be received causing the topology system logic to search the numerous constructs managed by the controller and display the tagged constructs, as well as any links therebetween, via the topology mapping. In yet some embodiments, responsive to received user input including one or more tags as search items, the topology system logic may generate visualizations illustrating the network flow of the corresponding tagged construct(s).

By querying the controller for construct metadata and receiving network data from one or more gateways, the topology system logic may generate the exemplary visualizations described above, and those shown in the accompanying drawings, that illustrate the flow of network traffic associated with one or more tagged constructs. As is noted throughout, the illustrated flow of network traffic may correspond to constructs deployed in multiple cloud networks. Such operability provides numerous advantages to users over the current art by enabling users to tag one or more gateways residing in different public cloud networks with meaningful tags and search for construct parameters, construct status, link status and the flow of network traffic corresponding to that tag.

An additional functionality of the topology system logic is the generation of visualizations that illustrate changes to aspects of the network managed by the controller over time. For example and as discussed below, the topology system logic may store the received data pertaining to the network (the network data and the construct metadata) for given points in time, e.g., $t_1 \rightarrow t_i$ (where i>1). Upon receiving user input corresponding to a request to display the changes between two points in time, e.g., $t_1$ and $t_2$, the topology system logic compares the stored data for $t_1$ and $t_2$, and generate a visual that highlights the change(s) between the network at $t_1$ and $t_2$. The term "highlight" may refer to any visual indicator or combination of visual indicators, such as color-coding constructs having changed parameters, varying the size of constructs having changed parameters, displaying a graphic (e.g., a ring) around constructs having changed parameters, displaying a window or other image that lists the detected changes in state of the network, which may spanning multiple public cloud networks, between time $t_1$ and time $t_2$, or other types of visual indicators.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "construct" may be construed as a virtual or physical logic directed to a particular functionality such as a gateway, virtual private cloud network (VPC), sub-network, or the like. For instance, as an illustrative example, the construct may correspond to virtual logic in the form of software (e.g., a virtual machine), which may assign a device-specific address (e.g., a Media Access Control "MAC" address) and/or an IP address within an IP address range supported by to a particular IP subnet. Alternatively, in some embodiments, the construct may correspond to physical logic, such as an electronic device that is communicatively coupled to the network and assigned the MAC and/or IP address(es). Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). It is contemplated that each construct may constitute at least logic residing as part of a public network, although certain constructs may be deployed as part of an "on-premises" (or local) network.

The term "gateway" may refer to a software instance deployed within a public cloud network or a virtual private cloud network deployed with the public cloud network and controls the flow of data traffic within and from the public cloud network (e.g., to one or more remote sites including computing devices that may process, store and/or continue the routing of data). Herein, each gateway may operate as a "transit gateway" or "spoke gateway," which are gateways having similar architectures but are identified differently based on their location/configurations within a cloud computing environment. For instance, a "spoke" gateway is configured to interact with targeted instances while a "hub" gateway is configured to further assist in the propagation of data traffic (e.g., one or more messages) directed to a spoke gateway or a computing device within an on-premises network.

The term "network traffic metrics" may refer to measurements of network traffic transmission including amount, frequency and/or latency. In some embodiments, network traffic metrics may include identification of a source and/or destination (e.g., IP address, originating/destination gateway, originating/destination VPC, originating/destination geographic region, etc.). Further, in some embodiments, network traffic metrics may also refer to analyses performed on and/or filtering of measurements of network traffic transmission.

The term "controller" may refer to a software instance deployed within a cloud computing environment (e.g., resources of a public cloud network) that manages operability of certain aspects of one or more cloud computing environments spanning across different public cloud networks (multi-cloud network). For instance, a controller may be configured to collect information pertaining to each VPC and/or each gateway instance and configures one or more routing tables associated with one or more VPCs and/or gateway instances spanning a multi-cloud network to establish communication links (e.g., logical connections) between different sources and destinations. These sources and/or destinations may include, but are not restricted or limited to on-premises computing devices, gateway instances or other types of cloud resources.

The term "message" generally refers to information in a prescribed format and transmitted in accordance with a suitable delivery protocol. Hence, each message may be in the form of one or more packets, frames, or any other series of bits having the prescribed format.

The term "link" may be generally construed as a physical or logical communication path between two or more constructs. For instance, as a physical communication path, wired and/or wireless interconnects in the form of electrical wiring, optical fiber, cable, bus trace, or a wireless channel using infrared, radio frequency (RF), may be used. A logical communication path includes any communication scheme that enables information to be exchanged between multiple constructs Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described II. General Architecture—Topology System Referring to FIG. 1, a diagram of an exemplary embodiment of a distributed cloud management system 100 is shown, where the cloud computing system features a controller 102 for managing constructs residing in multiple cloud networks and a software instance 138 to visualize the managed constructs (hereinafter, "topology system logic"). More specifically, the controller 102 is configured to manage multiple constructs spanning multiple cloud networks, such as cloud (network) A 104 and cloud (network) B 106. In the exemplary illustration, cloud A 104 provides computing resources ("resources") for a transit gateway 114 in communication with gateways $118_1$-$118_2$ associated with virtual networks (VNETs) $116_1$-$116_2$. Cloud B 106 provides resources for a transit gateway 120 in communication with gateways $124_1$-$124_2$ associated with virtual private clouds (VPCs) $122_1$-$122_2$. Cloud B 106 further provides resources for a native transit hub 126 in communication with VPCs 128 and 130. According to this embodiment of the disclosure, as shown in FIG. 1, the transit gateways 114, 120 and the native transit hub 126 are in communication with each other. Thus, as should be clearly understood that the controller 102 is managing several constructs, such as the illustrated gateways, that span multiple cloud networks.

Specifically, a first grouping of constructs 108 is deployed within the Cloud A 104, and second and third groupings of constructs 110, 112 are deployed within Cloud B 106. The controller 102 utilizes a set of APIs to provide instructions to and receive data (status information) associated with each of these constructs as well as status information pertaining to each connection between these constructs (link state). The construct metadata returned by a construct may depend on the type of construct (e.g., regions, VPCs, gateway, subnets, instances within the VPCs, etc.), where examples of construct metadata may include, but is not limited or restricted to one or more of the following construct parameters (properties): construct name, construct identifier, encryption enabled, properties of the VPC associated with that construct (e.g. VPC name, identifier and/or region, etc.), cloud properties in which the construct is deployed (e.g., cloud vendor in which the construct resides, cloud type, etc.), or the like.

Additionally, the cloud management system 100 includes topology system logic 138 processing on cloud computing resources 136. In some embodiments, the topology system logic 138 may be logic hosted on a user's Infrastructure as a Service (IaaS) cloud or multi-cloud environment. As one example, the topology system logic 138 may be launched as an instance within the public cloud networks (e.g., as an EC2® instance in AWS®). As an alternative example, the topology system logic 138 may be launched as a virtual machine in AZURE®. When launched, the topology system logic 138 is assigned a routable address such as a static IP address for example.

As shown, the topology system logic 138 is in communication with the controller 102 via, for example, an API that enables the topology system logic 138 to transmit queries to the controller 102 via one or more API calls. The topology system logic 138, upon execution by the cloud computing resources 136, performs operations including querying the controller 102 via API calls for construct metadata in response to a particular event. The particular event May be in accordance with a periodic interval or an aperiodic interval or a triggering event such as a user request for a visualization via user input.

In some embodiments, in response to receiving a query via an API call from the topology system logic 138, the controller 102 accesses data stored on or by the controller 102 and returns the requested data via the API to the topology system logic 138. For example, the topology system logic 138 may initiate one or more queries to the controller 102 to obtain topology information associated with the constructs managed by the controller 102 (e.g., a list of all gateways managed by the controller 102, a list of all VPCs or VNETs managed by the controller 102, or other data gathered from database tables) along with status information associated with each construct as described above.

Upon receiving the requested construct metadata, the topology system logic 138 performs one or more analyses and determines whether any additional construct metadata needs to be requested. For example, the topology system logic 138 may provide a first query to the controller 102 requesting a list of all gateways managed by the controller 102. In response to receiving the requested construct metadata, the topology system logic 102 determines the interconnections between the gateways listed. Subsequently, the topology system logic 138 may provide a second query to the controller 102 requesting a list of all VPCs managed by the controller. In response to receiving the requested construct metadata, the topology system logic 138 determines the associations between each VPC and a corresponding gateway.

For example, in some embodiments, the received construct metadata provides detailed information for each gateway enabling the topology system logic 138 to generate a data object, e.g., a database table of the construct metadata, that represents a gateway. The data object representing the multiple gateways are cross-referenced to build out a topology mapping based on the parameters of each gateway, which may include, inter alia: cloud network user account name; cloud provider name; VPC name; gateway name; VPC region; sandbox IP address; gateway subnet identifier; gateway subnet CIDR; gateway zone; name of associated cloud computing account; VPC identifier; VPC state; parent VPC name; VPC CIDR; etc. Similarly, the construct metadata is also utilized to generate a data object representing each VPC object and each subnet object.

Additionally, in order to determine whether a connection within the network is between two transit gateways, a separate API call may be utilized by the topology system logic 138 to query the controller 102 for a listing of all transit gateways. Thus, the topology system logic 138 is then able to determine whether a connection between a first gateway and a second gateway is between two transit gateways. In some embodiments, as will be discussed below, the connections between transit gateways and the connections between a spoke gateway and a transit may be represented visually in two distinct methods.

In addition to receiving the construct metadata from the controller 102, the topology system logic 138 may also receive network data from one or more gateways managed by the controller 102. For example, the network data may include for each network packet, but is not limited or restricted to, an ingress interface, a source IP address, a destination IP address, an IP protocol, a source port for UDP or TCP, a destination port for UDP or TCP, a type and code for ICMP, an IP "Type of Service," etc. In one embodiment, the network data may be transmitted to the topology system logic 138 from a gateway using an IP protocol, for example, UDP. In some embodiments, the network data is collected and exported via the NetFlow network protocol.

In order to configure a gateway to transmit the network data to the topology system logic 138, the topology system logic 138 may provide instructions to the controller 102, which in turn provides the instructions to each gateway managed by the controller 102. The instructions provide the IP address of the topology system logic 138, which is used as the IP address for addressing the transmission of the network data.

As will be discussed in detail below, the topology system logic 138 may generate a visualization platform comprising one or more interactive display screens. These display screens may include a dashboard, a topology mapping and a network flow visualization. Additionally, the visualization platform may be configured to receive user input that causes filtering of the of the displayed data.

For example and still with reference to FIG. 1, the topology system logic 138 may generate a topology mapping visualization of the connections linking the constructs detected by the controller 102, which are illustrated by the constructs within a logical region 132 represented by Cloud A 104 and Cloud B 106. Additionally, the topology system logic 138 may generate various graphical user interfaces (GUIs) that illustrates network traffic flows, traffic flow heat maps, packet capture, network health, link latency, encryption, firewalls, etc., of network traffic flowing between, to and from constructs managed by the controller 102 as illustrated by a second logical region 134.

Embodiments of the disclosure offer numerous advantages over current systems that provide a dashboard illustrating parameters of a controller as current systems do not provide the ability to visualize connections between constructs deployed across multiple cloud networks, the state of resources and connections between resources for multiple clouds and the flow of network data through constructs spanning multiple clouds. As one example, an enterprise network may utilize resources deployed in a plurality of cloud networks and an administrator of the enterprise network may desire to obtain visualization of the status of all constructs and connections associated with these resources. However, because the enterprise network spans multiple cloud networks, conventional systems fail to provide such a solution. By merely obtaining a textual representation of a status of each construct within a single cloud (e.g., through a command line interface), an administrator is unable to obtain a full view of the constructs, connections therebetween and the status of each for the entire enterprise network. Further, detection of anomalous or malicious network traffic patterns may not be detectable in the manner provided by current systems.

As used herein, a visualization (or visual display) of the constructs, connections therebetween and the status of each is referred to as a topology mapping. Current systems fail to provide a topology mapping across multiple cloud networks and fail to allow an administrator to search across multiple cloud networks or visualize how changes in a state of a construct or connection in a first cloud network affects the state of a resource or connection in a second cloud network. In some embodiments, the topology mapping may automatically change as a state of a construct or connection changes or upon receipt of construct metadata updates in response to certain events such as at periodic time intervals (e.g., a "dynamic topology mapping").

In some embodiments, a network may be deployed across multiple cloud networks using a plurality of controllers to manage operability of the network. In some such embodiments, each controller may gather the information from the network and constructs which it manages and a single controller may obtain all such information, thereby enabling the visualization platform to provide visibility across a network (or networks) spanning multiple controllers.

Figure 2A:
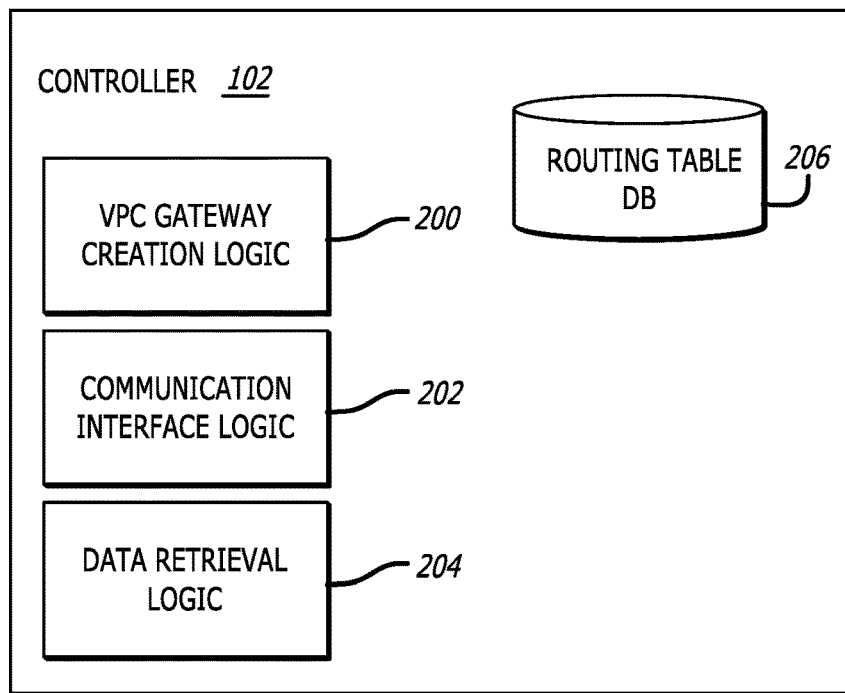
FIG. 2A is an exemplary illustration of a logical representation of a controller deployed within a cloud computing platform in accordance with some embodiments.

Referring to FIG. 2A, an exemplary illustration of a logical representation of the controller 102 deployed within the cloud management system 100 is shown in accordance with some embodiments. The controller 102, as noted above, may be a software instance deployed within the cloud network to assist in managing operability of constructs within multiple public cloud networks. According to this embodiment, the controller 102 may be configured with certain logic modules, including, a VPC gateway creation logic 200, a communication interface logic 202 and a data retrieval logic 204. The controller 102 may also include a routing table database 206.

In some embodiments, the gateway creation logic 200 performs operations to create a gateway within a VPC including creating a virtual machine within a VPC, provide configuration data to the virtual machine, and prompt initialization of the gateway based on the configuration data. In one embodiment in which the cloud computing resources utilized are AWS®, the VPC gateway creation logic 200 launches a virtual machine within a VPC, the virtual machine being an AMAZON® EC2 instance. The virtual machine is launched using a pre-configured virtual machine image published by the controller 102. In the particular embodiment, the virtual machine image is an Amazon Machine Image (AMI). When launched, the virtual machine is capable of receiving and interpreting instructions from the controller 102.

The communication interface logic 202 may be configured to communicate with the topology system logic 138 via an API. The controller 102 may receive queries from the topology system logic 138 via one or more API calls and respond with requested data via the API.

The data retrieval logic 204 may be configured to access each construct managed by the controller 102 and obtain construct metadata therefrom. Alternatively, or in addition, the data retrieval logic 204 may receive such construct metadata that is transmitted (or "pushed") from the constructs without the controller 102 initiating one or more queries (e.g., API calls).

The routing table database 206 may store VPC routing table data. For example, the controller 102 may configure a VPC routing table associated with each VPC to establish communication links (e.g., logical connections) between a transit gateway and cloud instances associated with a particular instance subnet. A VPC routing table is programmed to support communication links between different sources and destinations, such as an on-premise computing devices, a cloud instance within a particular instance subnet or the like. Thus, the controller 102 obtains and stores information that reveals certain properties of resources (e.g., constructs such as gateways, subnets, VPCs, instances within VPCs, etc.) within the purview of the controller 102 as well as status information pertaining to the connections (communication links) between with these resources.

Figure 2B:
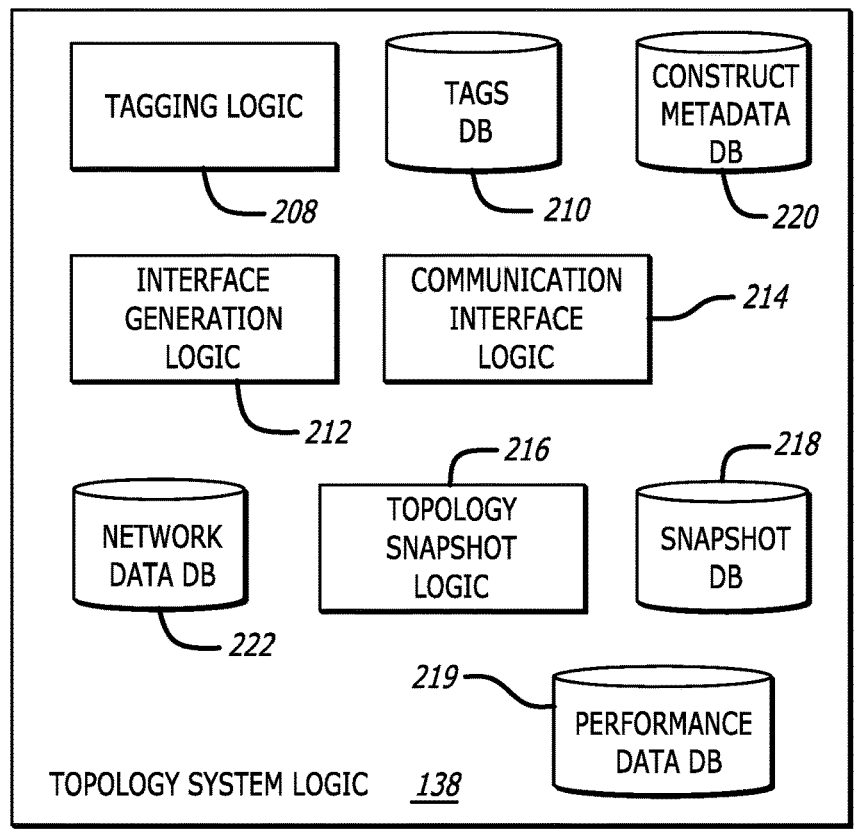
FIG. 2B, an exemplary illustration of a logical representation of the topology system logic deployed within a cloud computing platform in accordance with some embodiments.

Referring to FIG. 2B, an exemplary illustration of a logical representation of the topology system logic 138 deployed within a cloud computing platform is shown in accordance with some embodiments. The topology system logic 138 may be a software instance deployed using the cloud computing resources 136 and is configured to communicate with the controller 102 and each of the gateways managed by the controller 102. The topology system logic 138 is configured with certain logic modules, including, a tagging logic 208, a tags database 210, an interface generation logic 212, a communication interface logic 214, and a topology snapshot logic 216. Additionally, the topology system logic 138 may include a snapshot database 218, a performance data DB 219, a construct metadata database 220 and a network data database 222. The performance data DB 219 may store certain data utilized to filter a network topology graph as discussed below at least with respect to FIGS. 5A-5B. For instance, the performance data DB 219 may store data such as latency information between communicatively coupled gateways and certain performance metrics for any applicable construct such as resource usage (e.g., CPU, Disk, Memory).

In some embodiments, the tagging logic 208, upon execution by one or more processors, performs operations to generate tags and store such in the tags database 210. In some embodiments, the topology snapshot logic 216, upon execution by one or more processors, performs operations to obtain a snapshot (recorded data) of a current network topology state and store such in the snapshot database 218. Additional detail of the operations performed by the tagging logic 208 and the topology snapshot logic 216 is discussed in U.S. patent application Ser. No. 17/127,920, filed Dec. 18, 2020, the entire contents of which is incorporated herein.

In some embodiments, the interface generation logic 212, upon execution by one or more processors, performs operations as discussed below and that cause generation of exemplary interactive user interfaces as illustrated in FIGS. 3A-7.

In some embodiments, the communication interface logic 214, upon execution by one or more processors, performs operations as discussed herein pertaining to querying a controller for construct metadata, receiving the requested construct metadata and receiving the network data from one or more gateways managed by the controller. In some embodiments, the received construct metadata and network data may be stored in the construct metadata database 220 and the network data database 222 (which may be separate or a combined database).

III. Exemplary User Interfaces—Topology System Visualization Platform

The exemplary user interfaces illustrated in FIGS. 3-5B may be configured by the topology system logic 138 to be rendered and displayed on various display screens and via various applications. For example, each of the user interfaces illustrated in FIGS. 3-5B may be configured to be displayed through a web browser on a computer display screen, a laptop, a mobile device, or any other network device that includes a web browser. Additionally, each of the user interfaces illustrated in FIGS. 3-5B may be configured to be displayed through a dedicated software application installed and configured to be executed on any of the network devices described above. For example, the topology system logic 138 may be configured to provide the data and user interfaces described herein to a software application (known in the art as an "app") that may be installed and configured to be executed by one or more processors of a network device. Thus, upon execution, the app causes the user interfaces described herein to be rendered on the display screen of the network device (or an associated display screen).

1. Dashboard

Figure 3:
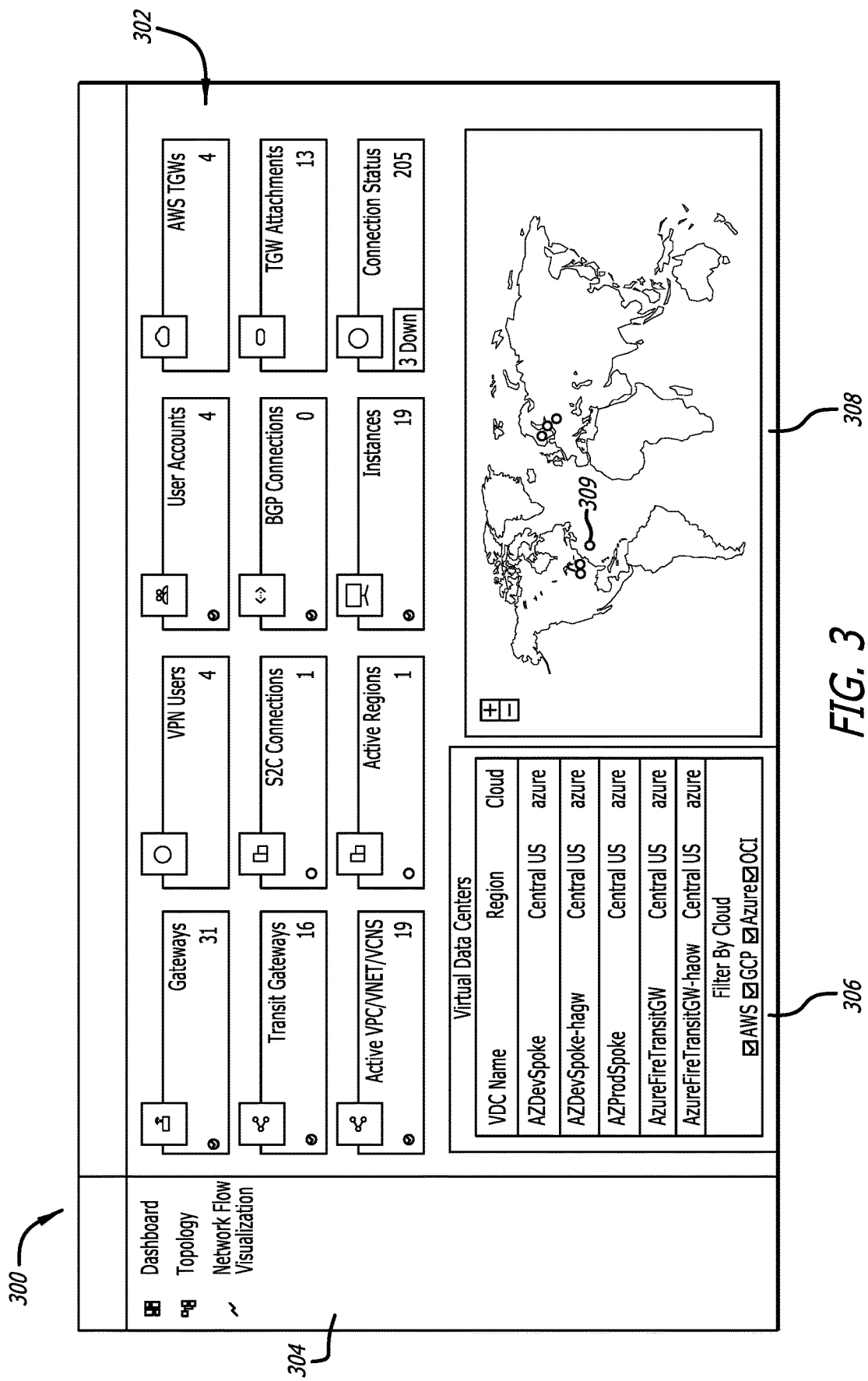
FIG. 3 is an interface screen displaying portions of a dashboard of a visualization platform directed to illustrating information pertaining to network traffic and constructs within a cloud-computing environment according to some embodiments.

Referring now to FIG. 3, a graphical user interface (GUI) screen (or "interface screen") displaying portions of a dashboard of a Topology System visualization platform ("visualization platform") with each portion configured to illustrate information obtained or determined by the Topology System is shown according to some embodiments. The interface screen of FIG. 3 may collectively comprise a "dashboard" 300 in combination with other interface screens as detailed in U.S. patent application Ser. No. 17/127,920, filed Dec. 18, 2020, the entire contents of which is incorporated herein. The dashboard 300 displays various attributes pertaining to a network that is deployed across one or more cloud providers, and notably across multiple cloud providers.

For example, the dashboard 300 as shown in FIG. 3 include several display portions 302, 306, and 308. The navigation panel 304 is also shown as part of the visualization platform generated by the topology system logic 138. The display portion 302 displays information pertaining to constructs managed by a controller, e.g., the controller 102 of FIG. 1, with the constructs deployed in one or more cloud networks. The information displayed may include, but is not limited or restricted to, the number of gateways deployed, the number of current virtual private network (VPN) users, the number of user accounts, the number of transit gateways (TGWs), the number of network connections (optionally filtered according to cloud computing service), the number of Border Gateway Protocol (BGP) connections, the number of active VPCs, the number of active regions, the number of instances, connection statuses, etc.

The display portion 306 of FIG. 3 includes a listing of virtual data centers comprising resources of the network, again optionally spanning multiple cloud networks. Specifically, the display portion 306 includes user input fields (e.g., checkboxes) configured to receive user input indicating how whether displayed by the dashboard 300 is filtered by one or more particular cloud networks (e.g., AWS®, GOOGLE® CLOUD PLATFORM® (GCP), AZURE® ORACLE CLOUD INFRASTRUCTURE® (OCI)). In some embodiments, a virtual data center is a pool of cloud computing resources that may be hosted on a public cloud.

Further, display portion 308 illustrates a world map including a graphical representation, e.g., such as the icon 309, for each virtual data center listed in the display portion 306 and a position on the world map to signify its geographical location. The display portion 308 may be filtered in accordance with the selection of "Filter By Cloud" provided in the display portion 306 and may be configured to receive user input to adjust the magnification of the map (e.g., "zoom in" or "zoom out").

The navigation panel 304 includes links to each of the general visualizations provided by the visualization platform including the dashboard 300, which are also detailed in U.S. patent application Ser. No. 17/127,920, filed Dec. 18, 2020, the entire contents of which is incorporated herein.

2. Build Progression of Elliptical Layout of a Topology Network Graph

Systems and methods below provide for user interaction to control deployment functionality of cloud computing constructs through the interface screens generated by the topology system logic 138. Current systems have several disadvantages including providing a difficult, complex, and non-intuitive interface for building a network topology. Specifically, current systems do not provide for a graphical user interface configured to receive user input that directly corresponds to deployment instructions in creating a network topology, where the network topology is viewable as a network topology graph that is created in real-time as user input is received. Current systems may provide a spider-web-like network topology graph layout; such a layout has several disadvantages. For example, spider-web-like layouts are not scalable and viewable as the representation of constructs and connections therebetween becomes convoluted such that connections may not be visually understood in a quick and concise manner. Additionally, such layouts fail to provide any easily perceived visual indication as to either a CSP with which a construct is associated or a tier with which a construct is associated (see below). These are just a few of disadvantages of current systems that are solved by the systems and methods disclosed below.

FIGS. 4A-4G are a series of interface screens that illustrate the progression of building a network topology graph using the co-pilot interface. The technological improvements provided by systems and methods of the disclosure will become evident while viewing FIGS. 4A-4G. However, some of the technological improvements include, but are not limited or restricted to: providing a graphical user interface configured to receive user input that directly corresponds to instructions resulting in building (e.g., generating) of a network topology and the deployment thereof; the graphical user interface being intuitive by providing step-by-step instructions (e.g., providing a single "select cloud region" button resulting in display of additional user input (UI) elements "Cloud Provider", "Access Account", and "Region"), which guides the user in building a network topology (see FIGS. 4A-4B); providing a visual indication of the placement of constructs within separate and distinct resources provided by distinct cloud service providers (CSPs), within regions, and connections between the constructs; providing an elliptical layout of a network topology graph that is scalable in diameter and easily segmented by any of a variety of characteristics/parameters such as CSP, region, account, etc.; providing a tiered elliptical layout of a network topology graph such that constructs are placed within a corresponding tier allowing a user, administrator, etc., to visualize each tier in a separated manner (examples of tiers include, (i) transit VPCs and transit gateways, (ii) spoke VPCs and spoke gateways, (iii) subnets, (iv) VMs, etc.); providing visual adjustments of an elliptical layout of a network topology graph providing a visual indication of the sizing of each elliptical segment (e.g., sizing may be dynamically defined/selected to refer to various parameters including geographic, number of constructs deployed therein, percentage of overall topology network traffic propagated by constructs within a segment, percentage of latency between constructs, percentage of overall resources contained within a segment, etc., where visual adjustments may include color adjustments, sizing adjusts (e.g., relative physical size of each segment within an elliptical layout adjusts to visually illustrate sizing of each segment as defined above); providing an elliptical layout of a network topology graph configured to visually aggregate certain segments (e.g., non-selected segments, where a selected segment may be selected via user input for further investigation or viewing) and visually expand certain segments (e.g., a selected segment); providing an elliptical layout of a network topology graph that provides clear connections between constructs where the connections span different tiers and/or resources provided by different CSPs (e.g., visually illustrate a first construct deployed in a first cloud computing network provided by a first CSP being connected to a second construct deployed in a second cloud computing network provided by a second CSP, where the first and second cloud computing networks are visually presented in distinct elliptical segments), etc.

However, it should be understood that the elliptical layout is merely one such geometric shape that has been contemplated. Other layout shapes contemplated include, but are not restricted to, squares, rectangles, rhombuses, pentagons, hexagons, octagons, trefoil, etc. It has been further contemplated that the shape of the layout may adjust dynamically as the number of segments increase. For example, the topology system may be configured to generate a layout in a first shape when the network topology graph includes a first number of segments and adjust to a second shape when a segment is added (e.g., a heptagon when the network topology graph includes seven segments and an octagon when the network topology graph includes eight segments). However, as will be discussed below and illustrated in several figures, many embodiments are directed to an elliptical shape (e.g., a circle) in which the segments shrink or expand in size based on various factors such as the number of constructs deployed in association with each segment and/or the number of segments.

Figure 4A:
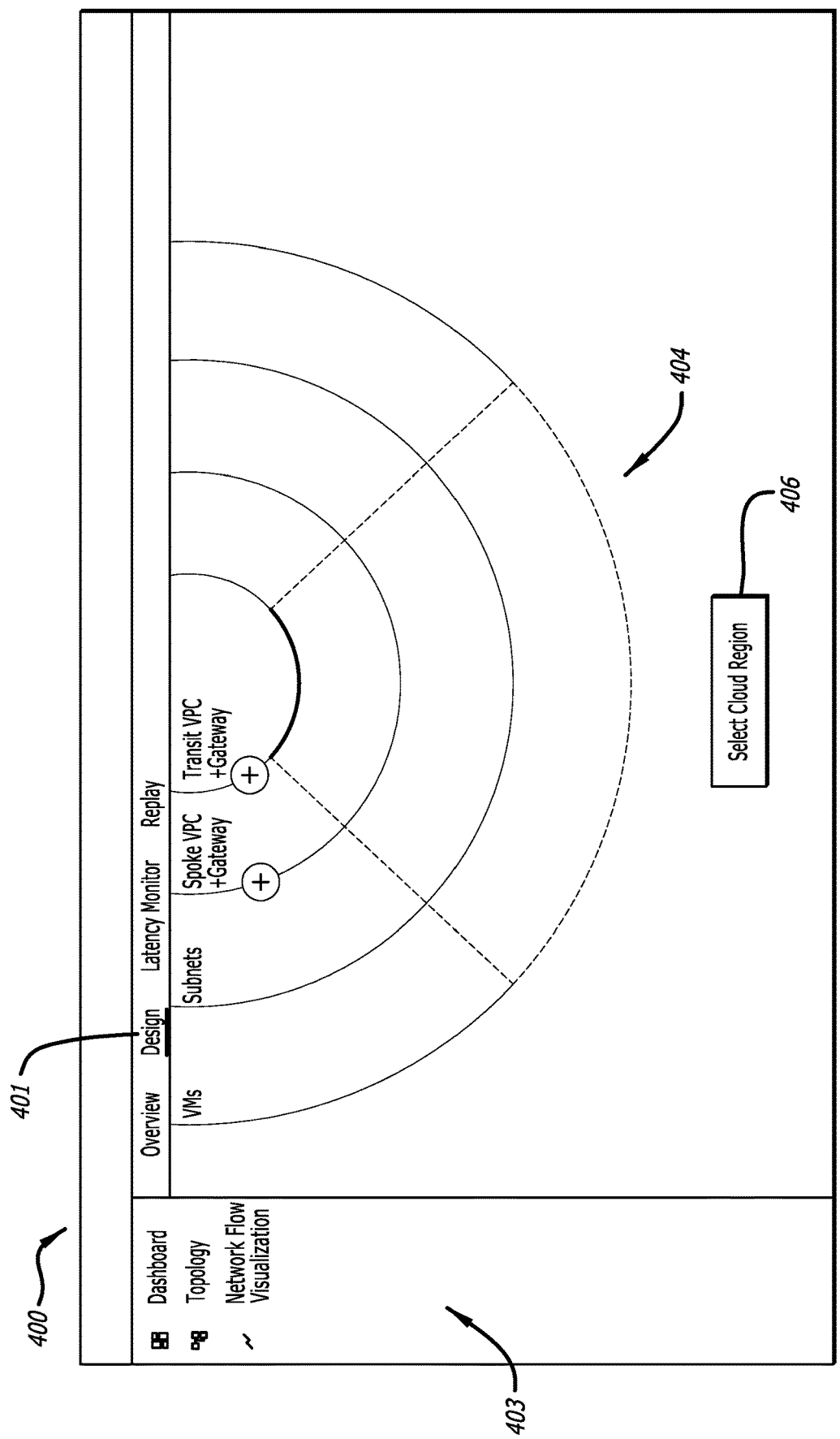
FIGS. 4A-4I are interface screens displaying a second embodiment of a network topology graph including a progression of building a network topology graph through user input and populated as a result of performance of operations of the distributed cloud computing system of FIG. 1 in accordance with some embodiments.
Figure 4B:
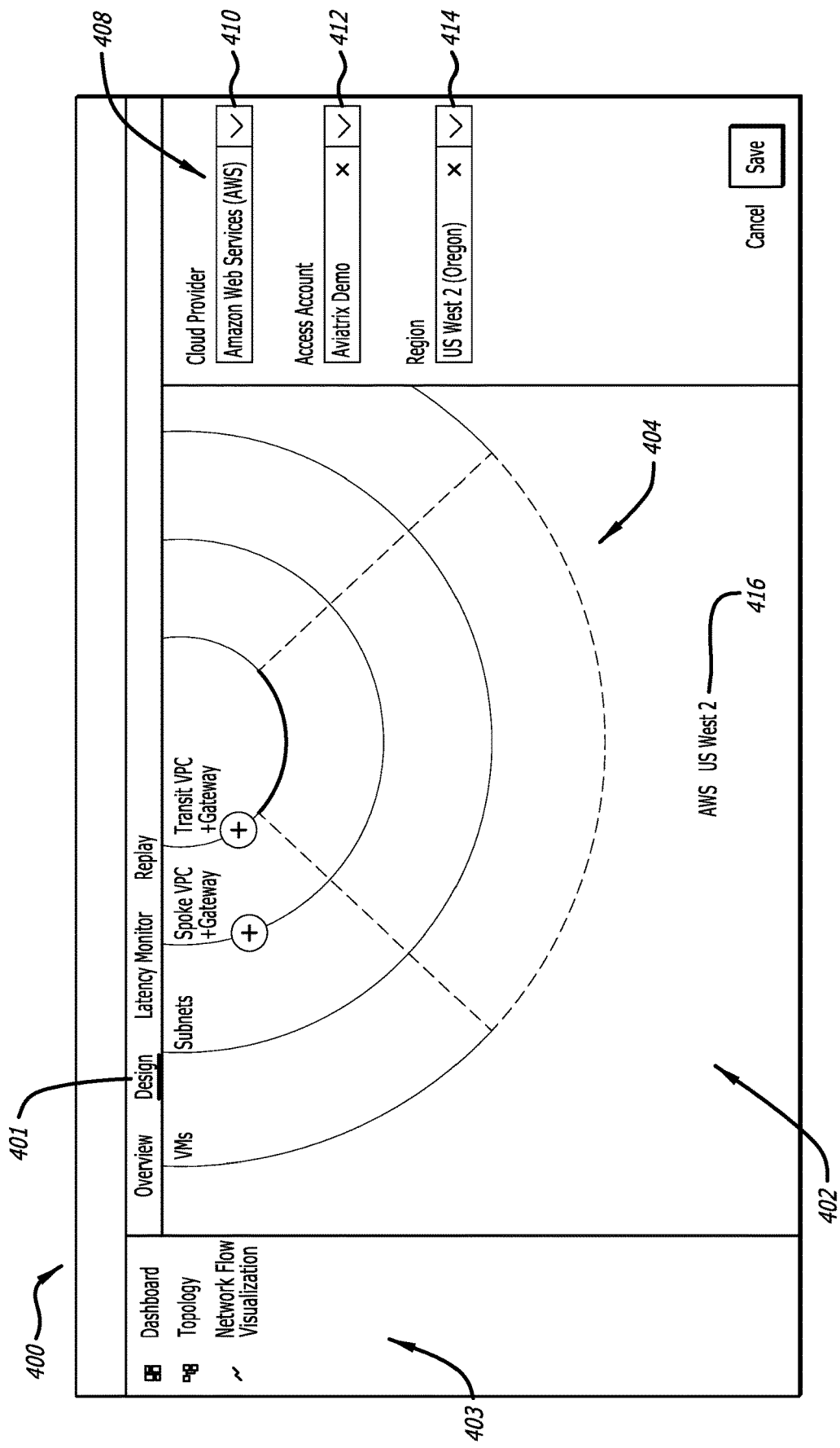

Referring now to FIGS. 4A-4G, interface screens displaying a second embodiment of a network topology graph including a progression of building a network topology graph through user input and populated as a result of performance of operations of the distributed cloud computing system of FIG. 1 are shown in accordance with some embodiments. With specific reference to FIG. 4A, the interface screen 400 is shown to include a "design" or "build" button (e.g., a UI element) 401 that, when activated, is configured to cause display/rendering of an elliptical layout build panel 402. The interface screen 400 may also include the navigation panel 403, which is similar to the navigation panel 304 of FIG. 3 and may include additional navigation options that provide access (e.g., cause display/rendering of) to certain features of systems and methods disclosed herein. FIG. 4A represents an initial interface screen in a build progression of a network topology graph having an elliptical layout (FIGS. 5A-5B provide an exemplary network topology graph having an elliptical layout). The elliptical layout build panel 402 (panel 402) also includes a UI element 406 that when activated by user input provides for the ability of the user or administrator (collectively, "administrator") to select a Cloud Service Provider (or simply, "Cloud Provider"), an access account, and a region, as shown in FIG. 4B.

Referring now to FIG. 4B, the interface screen 400 is seen to include a panel 408 that provides a plurality of UI elements including the UI element 410 corresponding to selection of a Cloud Provider, the UI element 412 corresponding to selection of an access account (e.g., an account/username corresponding to an account with the selected Cloud Provider), and the UI element 414 corresponding to selection of a region within cloud resources of the selected Cloud Provider. Following receipt of user input indicating selection (or manual entry) of a Cloud Provider, an access account, and a region, the panel 402 may be updated (revised or altered) to display a cloud region label 416.

In some embodiments, after user input is received corresponding to selection of a Cloud Provider, selectable access accounts are populated for selection via the UI element 412. In such an embodiment, the access account names may be stored for each Cloud Provider. In some instances, additional login criteria (e.g., passwords) may also be stored. However, in some instances, an administrator may be prompted to provide a password following section of an access account. Similarly, following receipt of user input corresponding to selection of an access account (and optionally receipt of additional login criteria), selectable regions may be populated for selection via the UI element 414. Selectable regions may be stored for each Cloud Provider/access account.

Figure 4C:
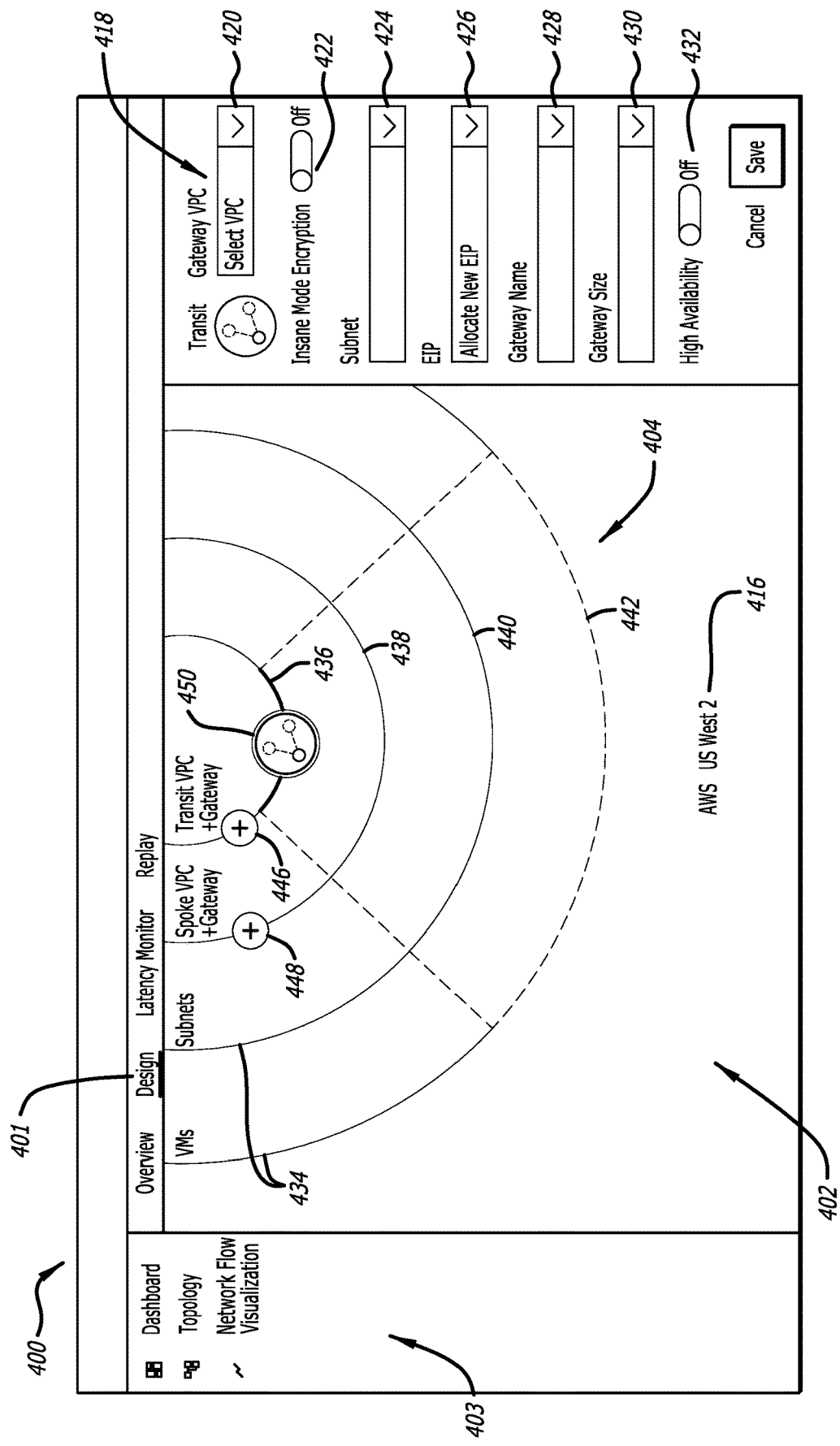
Figure 5A:
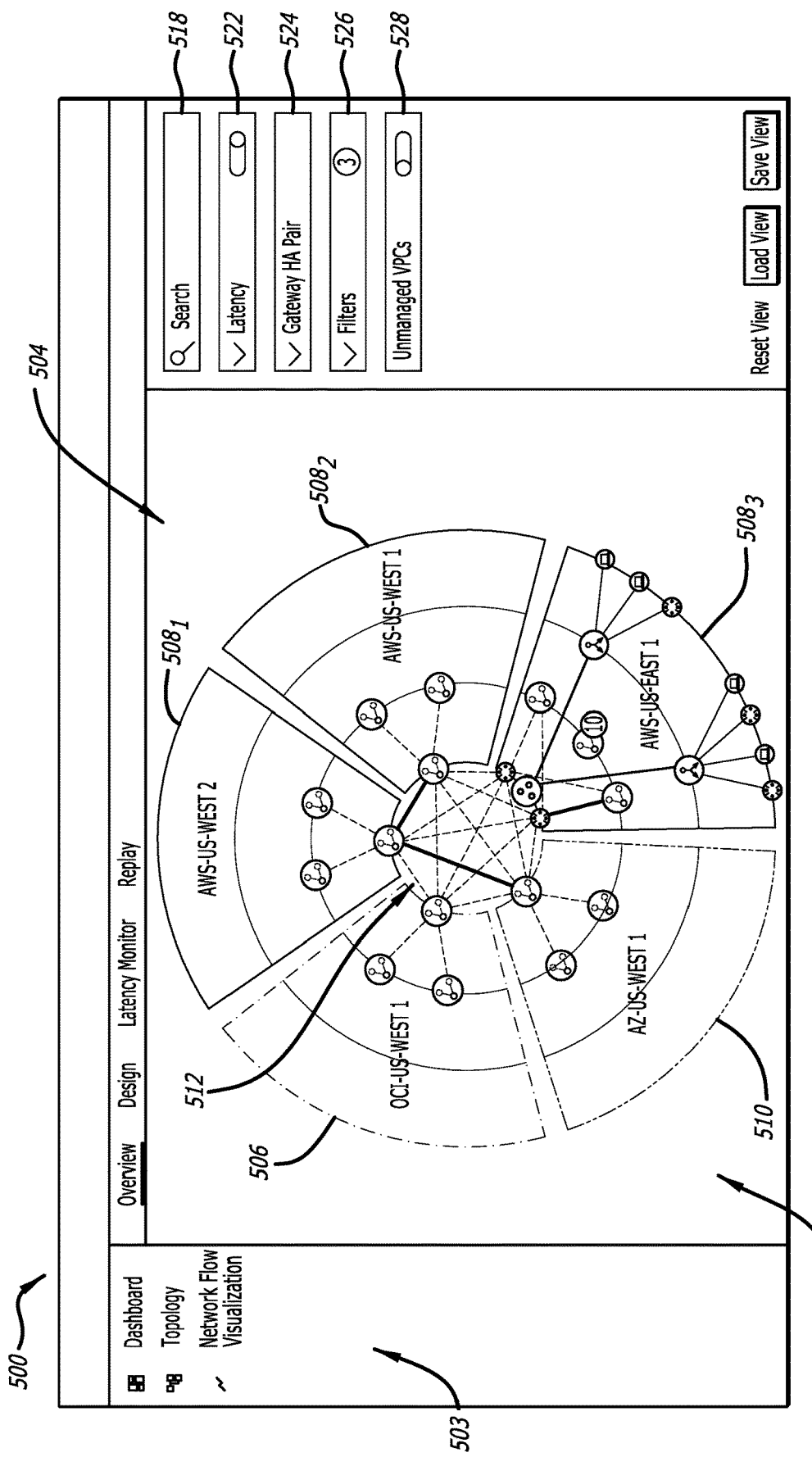
FIGS. 5A-5B are interface screens displaying an example network topology graph built via the methodology illustrated in FIGS. 4A-4I for monitoring of the network topology in accordance with some embodiments.
Figure 5B:
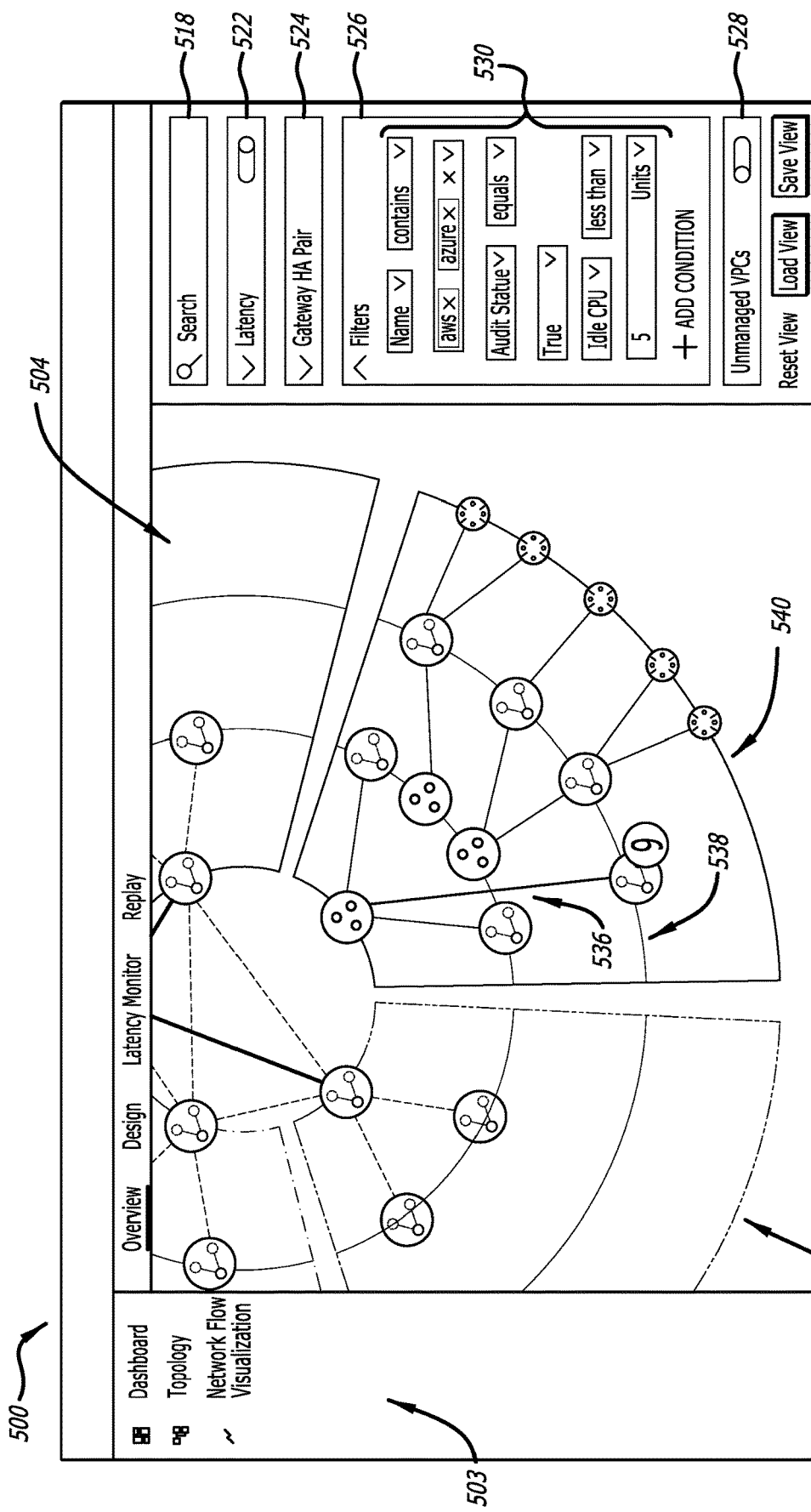

Referring now to FIG. 4C, a third progression of the interface screen 400 is provided that is configured to receive selection of constructs within the region as selected during the second progression as discussed above with respect to FIG. 4B. FIG. 4C illustrates that the interface screen 400 may include a construct addition panel 418 that includes a plurality of UI elements 420-432, each configured to receive user input corresponding to a specific parameter and/or feature of or associated with a construct. The panel 418 may display different UI elements configured to each receive specific user input based on selection/activation of a tier-specific construction addition button, e.g., the buttons 446, 448. As will be discussed further below, upon activation, each tier-specific construction addition button enables an administrator to add a construct to a particular tier within the elliptical layout of the topology network graph (which corresponds to deployment of a construct within a particular cloud region associated with a particular access account associated with a particular CSP).

Activation of the button 446 results in an update to the panel 402 to display a transit VPC/gateway icon 450 (e.g., a construct icon) on the transit VPC/gateway tier 436 (discussed below) and the display of the panel 418. In some embodiments, the rendering of the icon 450 is representative of a confirmation that the transit VPC/gateway have been deployed within the specified cloud region. Thus, the appearance of the icon 450 may provide confirmation to the administrator that the corresponding construct has been deployed and is operating properly. However, in other embodiments. The constructs corresponding to icons placed within a network topology graph may be deployed following receipt of user input activating a specific button (or another UI element), such as the "Save" button 411. In some instances, receipt of user input activating a specific button (or other UI element), such as the "Cancel" button 413 may cause deletion of the network topology graph (or edits since a last save action) or may prompt the administrator to save the network topology graph for further editing or deployment at a subsequent time. In further alternative embodiments, activation of the specific button (or another UI element), such as the "Generate Script" button 581 (FIG. 4G) may initiate the automated generation of a script that, upon execution, deploys the topology network. In some such embodiments, the script may be provided in a known programming language such as TERRAFORM®.

The UI elements displayed in FIG. 4C correspond to the addition of a transit VPC and gateway, which corresponds to activation of the button 448. The UI element 420 is configured to receive user input corresponding to selection of a transit VPC and gateway (or creation of a new transit VPC and gateway). In some embodiments, the user elements provided in the panel 418 may be pre-populated with any construct (e.g., virtual environments, gateways, subnets, virtual machine instances, etc.) that was previously generated in the same CSP region and associated with the same access account as entered in the panel 408 (of FIG. 4B).

Following selection of a transit VPC/gateway, the administrator may select to include an encryption mode for multi-tunnels extending to/from the selected transit VPC/gateway via the UI element 422. Detail pertaining to the encryption mode for multi-tunnels may be found in U.S. patent application Ser. No. 16/403,353, filed May 3, 2019, the entire contents of which is incorporated herein.

Additionally, the UI element 424 is configured to receive user input corresponding to selection of a subnet, UI element 426 is configured to receive user input corresponding to whether to allocate a new elastic internet protocol (EIP) address (and to what EIP to allocate the transit gateway), UI element 428 is configured to receive user input corresponding to selection of a gateway name, UI element 430 is configured to receive user input corresponding to a gateway size, and UI element 432 is configured to receive user input corresponding to selection of a high availability functionality of the transit gateway. Detail pertaining to the high availability functionality (or "active-active" functionality) may be found in U.S. patent application Ser. No. 17/216,596, filed Mar. 29, 2021, the entire contents of which is incorporated herein. Further discussion as to UI elements 424-432 is found below at least with respect to FIGS. 4D-4G.

Figure 4D:
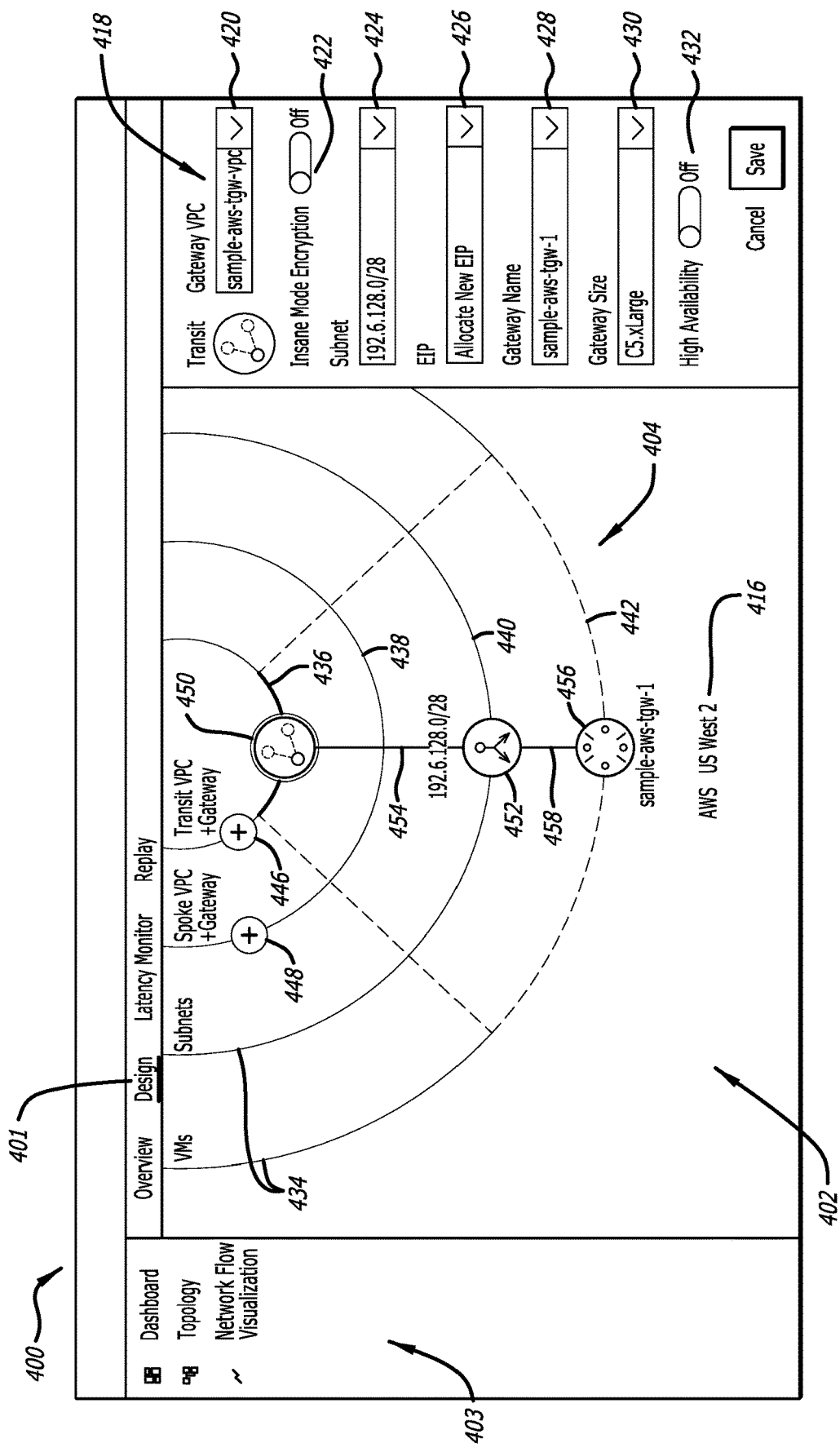

Referring now to FIG. 4D, a fourth progression of the interface screen 400 is provided. Many of the same elements and constructs that are seen in FIG. 4D were labeled and described with respect to FIGS. 4A-4C. For purposes of clarity, some of the reference numerals have not been repeated in FIG. 4D and those elements or constructs described above will not be described again unless to address a change or certain functionality. Following receipt of user input corresponding to addition of a transit VPC/gateway (represented by icon 450) and user input to the panel 418, specifically selection of a transit VPC/gateway via UI element 420, the UI element 424 may be populated with possible subnets that correspond to the selected transit VPC/gateway in UI element 420.

FIG. 4D illustrates receipt of user input to UI element 424 representing selection of the subnet "192.2.128.0/28", which also causes an update to the panel 402 providing an icon 452 representing the subnet "192.2.128.0/28" on the subnet tier along with an edge 454 illustrating a coupling between the selected VPC/gateway and the subnet "192.2.128.0/28". Additionally, FIG. 4D illustrates the receipt of user input to UI element 428, which corresponds to selection of a gateway to be deployed within the subnet "192.2.128.0/28" and such user input results in an update to the panel 402 to include icon 456 and edge 458 that extends from the subnet "192.2.128.0/28" to the gateway icon 456.

Figure 4E:
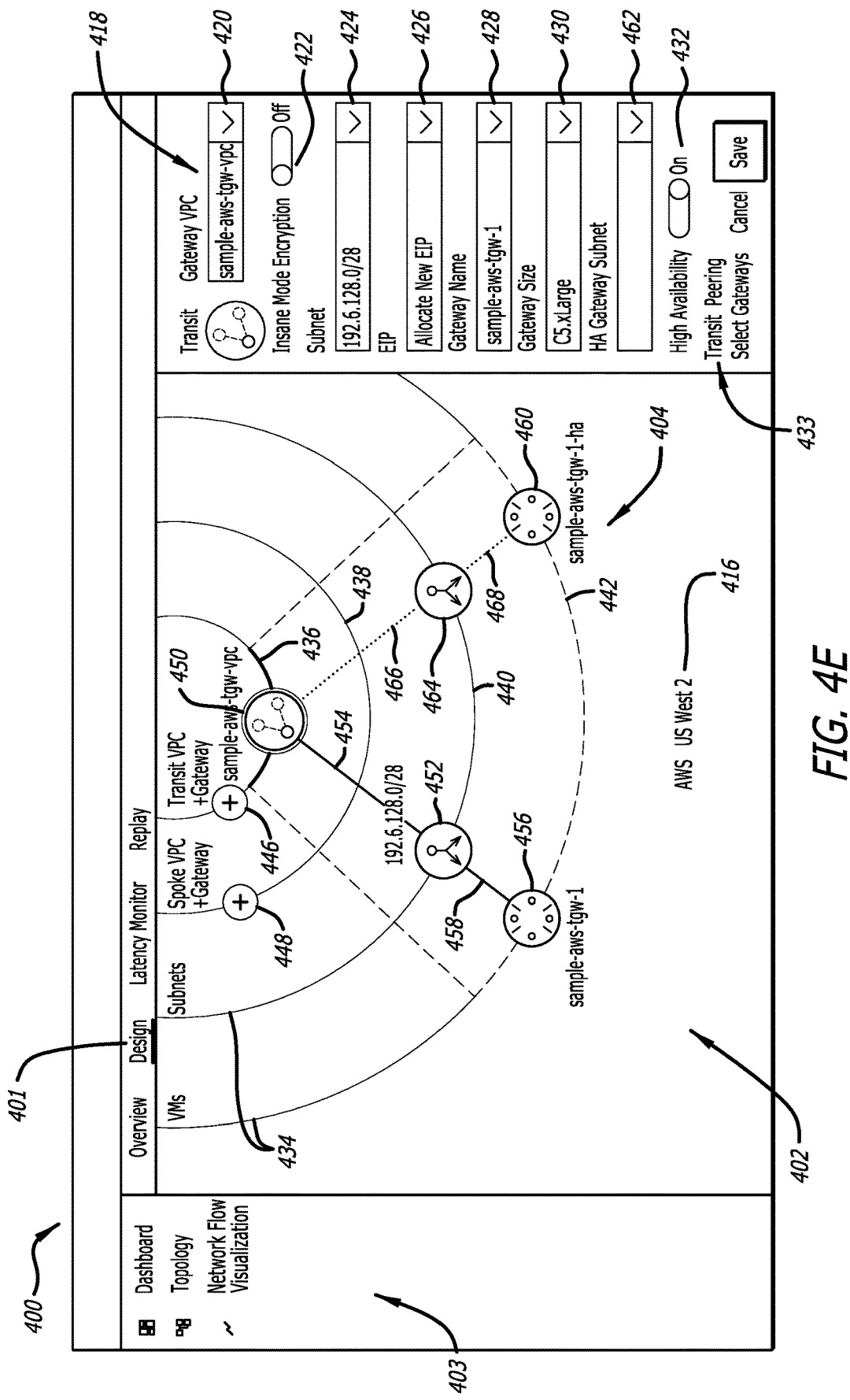

Referring now to FIG. 4E, a fifth progression of the interface screen 400 is provided in which receipt of user input selecting a "High Availability" feature of the gateway selected via UI element 428 is shown. Specifically, UI element 432 is shown to be activated indicating selection of a "High Availability" feature, which results in an update to the panel 402 to include gateway icon 460, which in this embodiment is labeled with "ha" indicating high availability. FIG. 4E also illustrates user input to UI element 430, which corresponds to selection of a size of the gateway selected via UI element 428. Additionally, the panel 418 may be updated to provide the UI element 462 that is configured to receive user input corresponding to a subnet for the high availability gateway. The corresponding subnet is illustrated in FIG. 4E via subnet icon 464, with an edge 466 illustrating a connection from the transit VPC/gateway icon 450 to the subnet icon 464. The high availability gateway icon 460 is shown to be connected to the subnet icon 464 via the edge 468. As discussed above, the icons of panel 402 illustrates constructs deployed within a cloud computing environment.

Figure 4F:
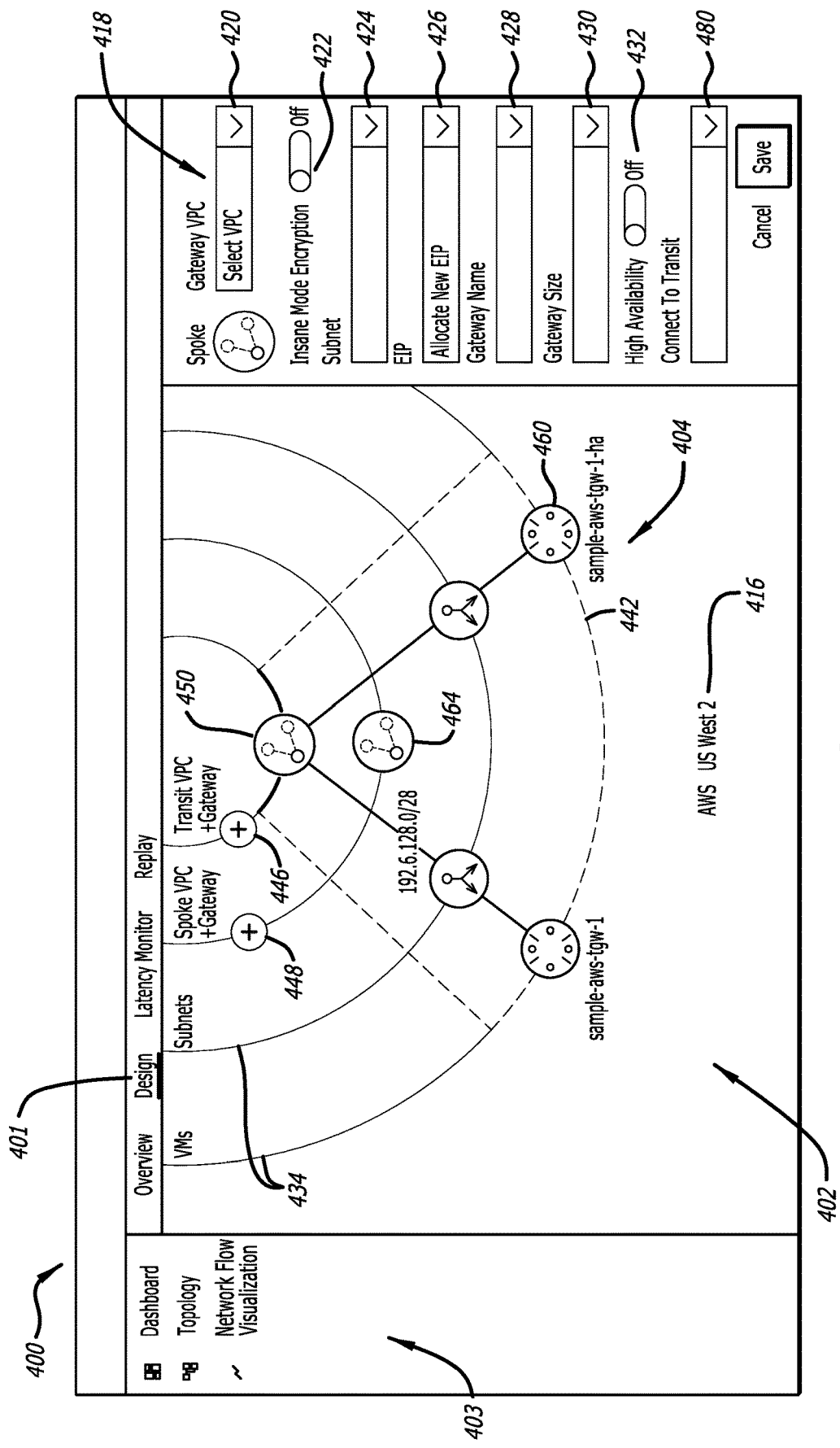
Figure 4G:
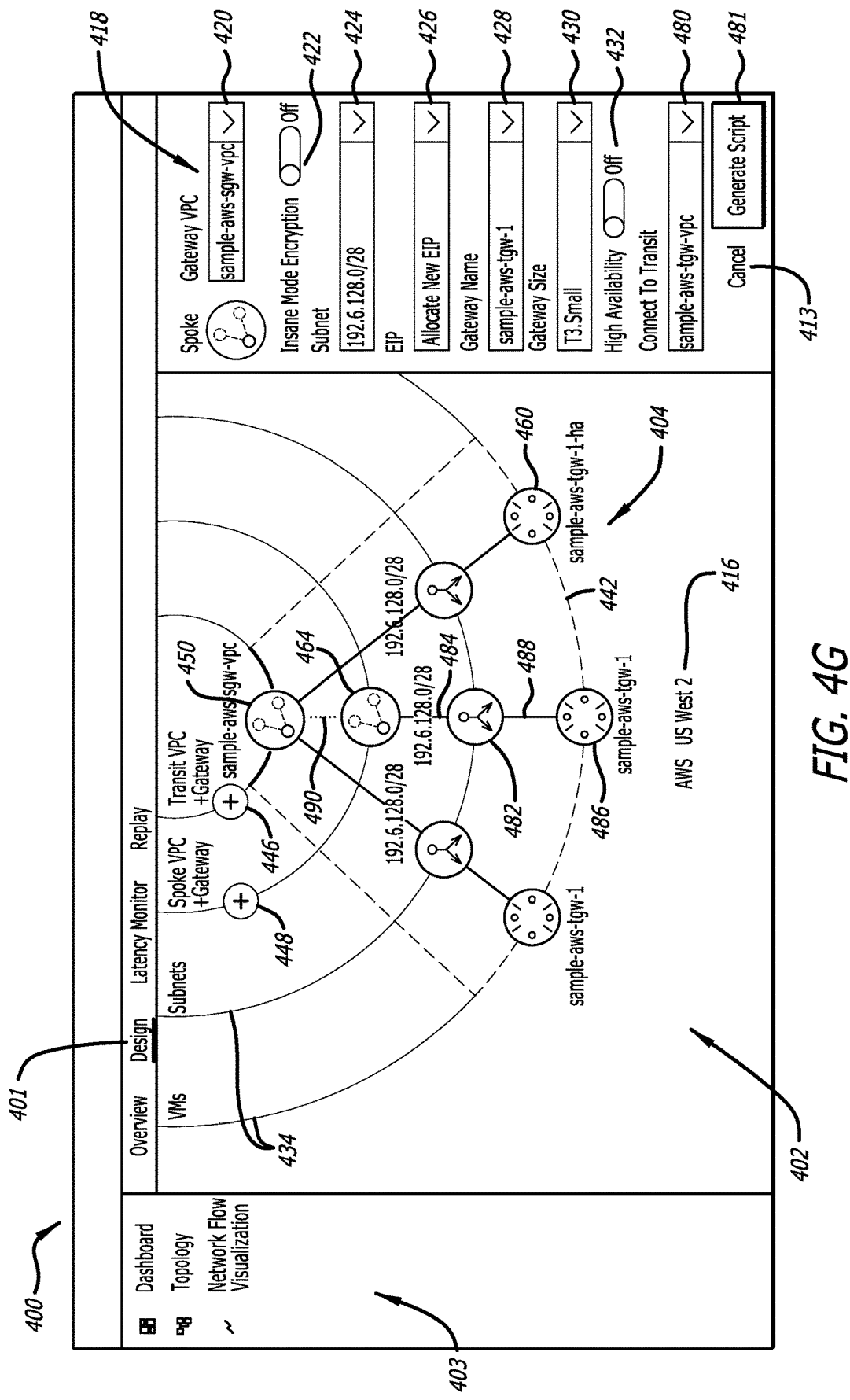
Figure 4H:
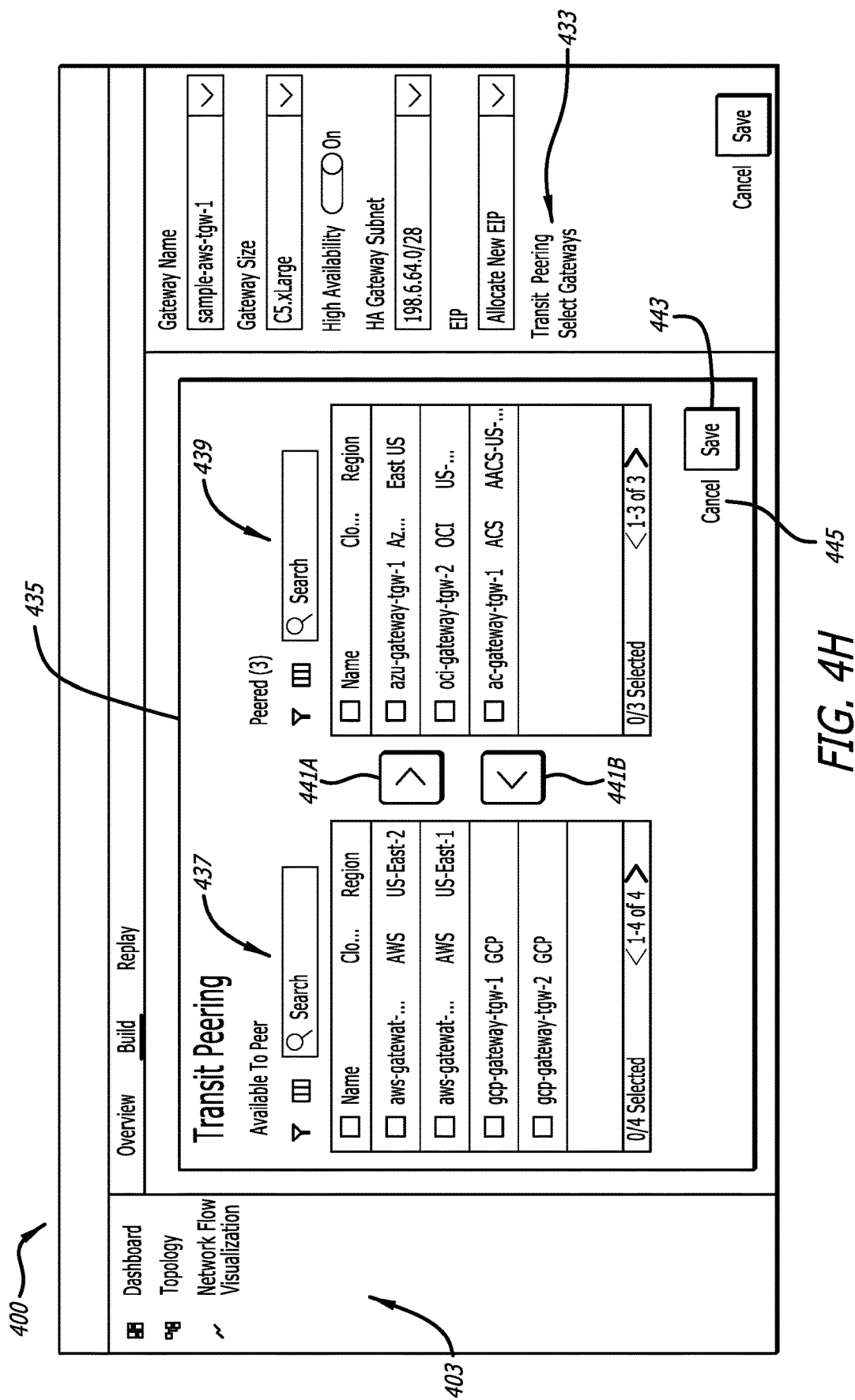
Figure 4I:
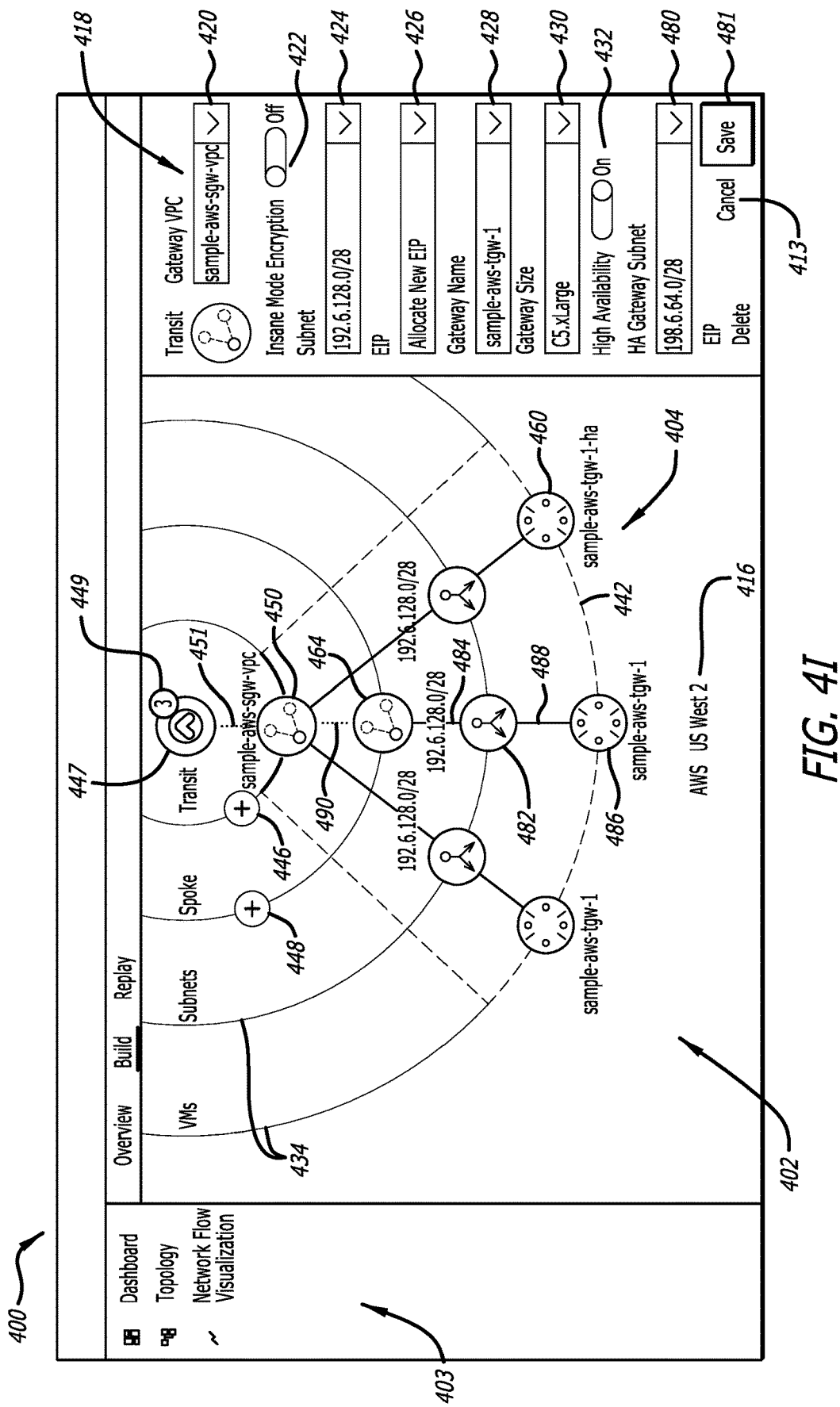

The panel 814 of FIG. 4E also illustrates a user element 433 configured to receive user input resulting in the generation a window (e.g., a pop-up) that provides for user ability to establish transit peering (see FIGS. 4H-4I). As noted above, transit peering refers to the communicative coupling between transit gateways. As discussed with respect to FIGS. 4H-4I, user input to select the transit peering option enables a user to select previously deployed (and currently active/deployed) transit gateways with which to establish a communicative coupling with the transit gateway currently being deployed (e.g., the transit gateway represented by the icon 450).

Referring now to FIG. 4F, a sixth progression of the interface screen 400 is provided in which receipt of user input adding a spoke gateway to the network topology graph via UI element 448 is shown. Such user input corresponds to deployment of a spoke gateway within the selected cloud region as discussed above (e.g., at least FIG. 4B). The addition of the spoke gateway follows the same procedure as discussed above with addition of a transit VPC/gateway. In particular, upon receipt of user input activating the UI element 448, the panel 418 is updated to illustrate UI elements 466-480, which represent parameters or functionalities for a spoke gateway, which correspond to those of the transit VPC/gateway (e.g., UI elements 420-432, 462) and thus the discussion of such need not be repeated. Such user input results in addition of the spoke gateway icon 464 within the selected cloud region discussed above.

Referring now to FIG. 4G, a seventh progression of the interface screen 400 is provided in which receipt of user input assigning a subnet to the spoke gateway of FIG. 4F, associating a gateway (see FIG. 4E) with the spoke gateway, and connecting the spoke gateway to the transit VPC/ gateway discussed above is shown. As illustrated, user input received by UI elements 468-480 result in addition of a subnet icon 482, an edge 484, a gateway icon 486, and edges 488-490. Further, the elliptical layout of FIG. 4A includes specific tiers (or rings) for various constructs with the tiers. Each of the icons 482-490 (including edges) appear in a corresponding tier or connecting icons in two corresponding tiers.

Referring now to FIG. 4H, an optional addition to the user interface 400 enabling establishment of transit peering is shown in accordance with some embodiments. The content window 435 may be displayed as a replacement to the network topology graph as displayed in FIGS. 4A-4G until a UI element is selected (e.g., such as a save button 443 or a cancel button 445) at which time the display returns to the network topology graph. Alternatively, the content window 435 may be a "pop-up" window that appears in front of the network topology graph. The content window 435 includes a first listing 437, which is a listing of transit gateways of transit gateways that are available for establishment of transit peering with a selected transit gateway (e.g., that represented by the icon 450 and listed in UI field 420 of the panel 418 as seen in FIG. 4E). Additionally, the content window 435 includes a second listing 439, which is a listing of transit gateways to which the selected transit gateway already has an established communicative coupling. Stated differently, the first listing 437 provides a list of the transit gateways available for transit peering with the gateway selected via the panel 418 ("transit gateway 450", which references the icon 450) and the second listing 439 provides a list of the transit gateways for which transit peering has already been established with the transit gateway 450.

A transit gateway (or multiple) appearing in the first listing 437 may be selected (e.g., clicked directly or the box to the left of the transit gateway name may be selected) and the button 441A activated. The selected gateway (or multiple) then appears in the second listing 439. A transit gateway appearing on the second listing 439 may be removed from the list by selection of the transit gateway and activation of the button 441B. Moving a selected transit gateway from the first listing 437 to the second listing 439 will cause establishment of a communicative coupling of the selected transit gateway and the transit gateway 450 upon receipt of user input selecting the "save" button 443 (or an analogous UI element). Moving a selected transit gateway from the second listing 439 to the first listing 437 will cause termination of the communicative coupling between the selected transit gateway and the transit gateway 450. Transit peering may be established or terminated through programming (or reprogramming) of corresponding routing tables by the controller that deployed, and is now managing, the two transit gateways. As noted, the changes may take effect upon selection of the save button 443.

Referring to FIG. 4I, the user interface 400 is shown following establishment of transit peering in accordance with some embodiments. FIG. 4I illustrates the constructs as deployed in FIG. 4E and includes the icon 447 and the edge 451, which represents that the transit gateway 450 is involved in transit peering with at least one other transit gateway. The icon 449 specifies the number of transit gateways with which the transit gateway 450 is involved in transit peering. In some instances, a user may directly access the content window 435 (FIG. 4H) through selection of the icon 447.

Thus, FIGS. 4A-4I illustrate a methodology through which an administrator may build a network topology by building a network topology graph through an intuitive user interface. In some embodiments, the constructs comprising the network topology may be deployed following user input to add a particular construct (e.g., add a transit VPC/gateway as in FIG. 4C) such that rendering of the corresponding icon (e.g., icon 450) confirms to the administrator that the construct was deployed as is operating properly. Alternatively, the construct(s) corresponding to the icon(s) placed on the panel 402 may be deployed upon receipt of user input activating a particular UI element (e.g., a "save" button represented by UI element 411). In yet other embodiments, user input activating a particular UI element (e.g., a "Generate Script" button represented by UI element 481 of FIG. 4G) may initiate the generation of a script that when executed, causes deployment of the constructs and connections included in the network topology graph.

Although FIGS. 4A-4I illustrate deployment of constructs in a single cloud region provided by a single CSP, addition cloud regions provided by other CSPs may be selected (added to the cloud computing environment in which the network topology is deployed). As a result, the user interface 400 enables an administrator to create a network topology that spans cloud resources provided by a plurality of CSPs and further allows the administrator to connect particular constructs deployed in a first cloud region provided by a first CSP to particular constructs deployed in a second cloud region provided by a second CSP. Additionally, it should be understood that a plurality of constructs may be added prior to deployment of any constructs. For instance, FIGS. 4C-4E illustrate one example of adding a transit VPC/gateway and corresponding subnet/virtual machine instance (with high availability). The process of adding the transit VPC/gateway and corresponding subnet/virtual machine instance (with or without high availability) may be repeated numerous times prior to deployment of any of the added constructs.

Referring to FIGS. 5A-5B, interface screens displaying an example network topology graph built via the methodology illustrated in FIGS. 4A-4G for monitoring of the network topology are shown in accordance with some embodiments. FIG. 5A provides an interface screen 500 illustrating a network topology graph 504 displayed on a display panel 502 and also includes a navigation panel 503 similar to the navigation panel 401. The topology graph 504 includes a plurality of segments with each segment representing a cloud region of cloud computing resources provided by a particular CSP. The segment 506 is a segment representing a first region of cloud computing resources provided by a first CSP (e.g., a West region provided by ORACLE® Cloud Infrastructure (OCI)), the segments $508_1$-$508_3$ are segments representing three regions of cloud computing resources provided by a second CSP (e.g., North, West, East regions provided by AMAZON WEB SERVICES® (AWS)), and the segment 510 is a first region of cloud computing resources provided by a third CSP (e.g., a West region provided by MICROSOFT® AZURE® cloud services). Additionally, a plurality of edges 512 are shown that represent communication paths between the transit VPCs of the network topology represented by the topology graph 504. In some embodiments, the edges 512 may provide a visual representation of latencies across the edges 512. In some embodiments, the visual representation may be color such that the color of an edge is dependent on the latency of network traffic propagating between the two corresponding transit VPCs. However, color is just one such distinction. Thus, FIGS. 5A-5B illustrate that a network topology graph may be built using the methodologies and systems described herein that spans cloud computing resources provided by a plurality of CSPs.

FIG. 5A also includes a filter panel 518 that allows an administrator to filter the topology graph 504 to illustrate certain aspects or constructs (or exclude such from the display). For example, the filter panel 518 includes UI elements 522-528 configured to receive user input indicating a filter to be applied to the aspects or constructs of the topology graph 504 to be displayed. For example, the UI element 522 represents a latency filter, which is configured to receive user input indicating a latency measure (e.g., number of seconds) that is to filter the constructs displayed in the topology graph 504 (e.g., display only the constructs having a latency greater than or equal to the latency measure or vice versa).

The UI element 524 represents a gateway high availability filter, which is configured to receive user input indicating whether to filter the gateways (and optionally any constructs located in outer tiers that are connected to such gateways) displayed in the topology graph 504 based on whether the gateways have the high availability functionality implemented.

Referring now to FIG. 5B, the UI element 526 represents miscellaneous filters such as name (of a construct, a CSP, a region, etc.), audit status (e.g., status of cloud access account enabling the controller that deployed and is configured to manage the constructs is valid (which may refer to being properly logged in and authenticated), includes the proper permissions), instance size, instance status ("active/deactivated" or "up/down"), tags, CPU usage, etc. As with the UI elements 522-524, the UI element 526 and its sub-elements 530 are configured to receive user input, which results in the filtering of the displayed aspects and/or constructs of the topology graph 504. FIG. 5B also illustrates that additional sub-elements may be added to the sub-elements 530 (e.g., to filter according to a text search, similar to filtering by name, by a tag added to a construct as discussed in U.S. patent application Ser. No. 17/127,920, filed Dec. 18, 2020, the entire contents of which is incorporated herein, and/or selection of sub-elements from a pre-populated list such as any network metric). The UI element 528 represents an unmanaged VPC filter such that, when activated, all constructs except unmanaged VPCs may be filtered out (or vice versa).

It should be noted that discussion of filtering of aspects or constructs of the topology graph 504 may refer to: the removal of certain aspects or constructs from the topology graph 504; a visual altering of certain aspects or constructs to be filtered out (e.g., reduction in size, alteration in opaqueness, alteration in color such as alteration to greyscale, etc.); and/or a visual altering of certain aspects or constructs that are not to be filtered out (e.g., increase in size, emphasis via a bolding or underlined manner, an elevation in view where such aspects or constructs appear closer to the viewer than the certain aspects or constructs to be filtered out, etc.).

FIGS. 5A-5B also illustrate an aggregation feature of the elliptical layout topology graph 504. The spoke gateway icon 532 (FIG. 5A) includes an aggregation icon ("10"), which indicates that the spoke gateway icon 532 may be expanded to illustrate additional constructs connected thereto as shown in FIG. 5B. Specifically, as shown in FIG. 5B, the spoke gateway icon 532 has been expanded to display ten icons consistent with the aggregation icon's "10" notation: two spoke gateways 536, three subnets 538, and five edge devices 540. Further, FIG. 5B illustrates that, in some embodiments, when one icon including an aggregation icon is expanded, other constructs may be aggregated into a single icon having an aggregation icon (e.g., subnets and edge devices illustrated in FIG. 5A are shown in an aggregated state in FIG. 5B).

The aggregation feature afforded by the elliptical layout provides a large advantage in improving the scalability of the interface screen to accommodate and intuitively display a topology graph including large set of constructs in a single display. For example, scaling may be performed through aggregation and expansion of construct icons, e.g., constructs stemming from a spoke gateway may be aggregated into a single spoke gateway icon that includes a notation (i.e., bubble number) indicating an aggregation of icons as shown.

The aggregation feature provides for the ability to aggregate icons into a single icon with an aggregation notation in various scenarios. For example, when the number of constructs within a single cloud region exceeds a threshold, one or more spoke gateway (and outer-tier constructs connected thereto) may be aggregated. The order in which spoke gateways are aggregated may be according to a predefined rule set (e.g., the spoke gateways may be aggregated based on: (i) the number of constructs connected thereto starting with the greatest number first; (ii) time since instantiation starting with the oldest, etc.). The expansion of an aggregation may occur automatically when the number of constructs within a cloud region no longer exceeds a threshold or based on user input indicating an expansion (in response, other gateways may be aggregated). In some embodiments, multiple spoke gateways may be aggregated into a single aggregation icon (e.g., when a certain cloud region is selected for inspection, the selected cloud region may increase in size while the non-selected regions may be reduced in size with the gateways aggregated either individually or as a multi-gateway aggregation). It is noted that transit gateways and constructs connected thereto may be aggregated in the same manner as is discussed herein with respect to spoke gateways.

As also illustrated in FIGS. 4A-5B, each cloud region may be illustrated as a distinct slice within the elliptical layout and a visual distinction may be included between cloud regions. Further, cloud regions provided by the same CSP may be illustrated in a visually similar manner and distinct from cloud regions provided by other CSPs, which provides quick visual indication of regions according to CSP (e.g., each CSP associated with a specific color and/or CSP specific iconography).

In some embodiments, the segments may adjust in size (e.g., based on a percentage of the resources of the network deployed in that region, the percentage of network traffic flowing through that region, etc.) where the sizing may automatically adjust such as following the addition of constructs to one or more regions. Alternatively, or in addition, the sizing may adjust at time intervals following computation of network traffic flow (e.g., every 2 minutes). In some instances, the size of a segment may adjust when a change in either construct percentage or network traffic flow percentage exceeds a change threshold, e.g., 10% change.

The monitoring capability provided by the elliptical layout of the topology graph 504 enables an administrator to easily perform trouble shooting operations directly within the interface screens of FIG. 5A-5B, which may include adding constructs to the network topology via the interface screen, restarting constructs via the interface screen, viewing latencies between constructs (e.g., gateways) etc. In some embodiments, selecting a construct may provide additional detail as to these trouble shooting operations, e.g., enabling specific action to be taken such as view latency between two selected gateways or restart a construct.

IV. Logical Flows

Figure 6:
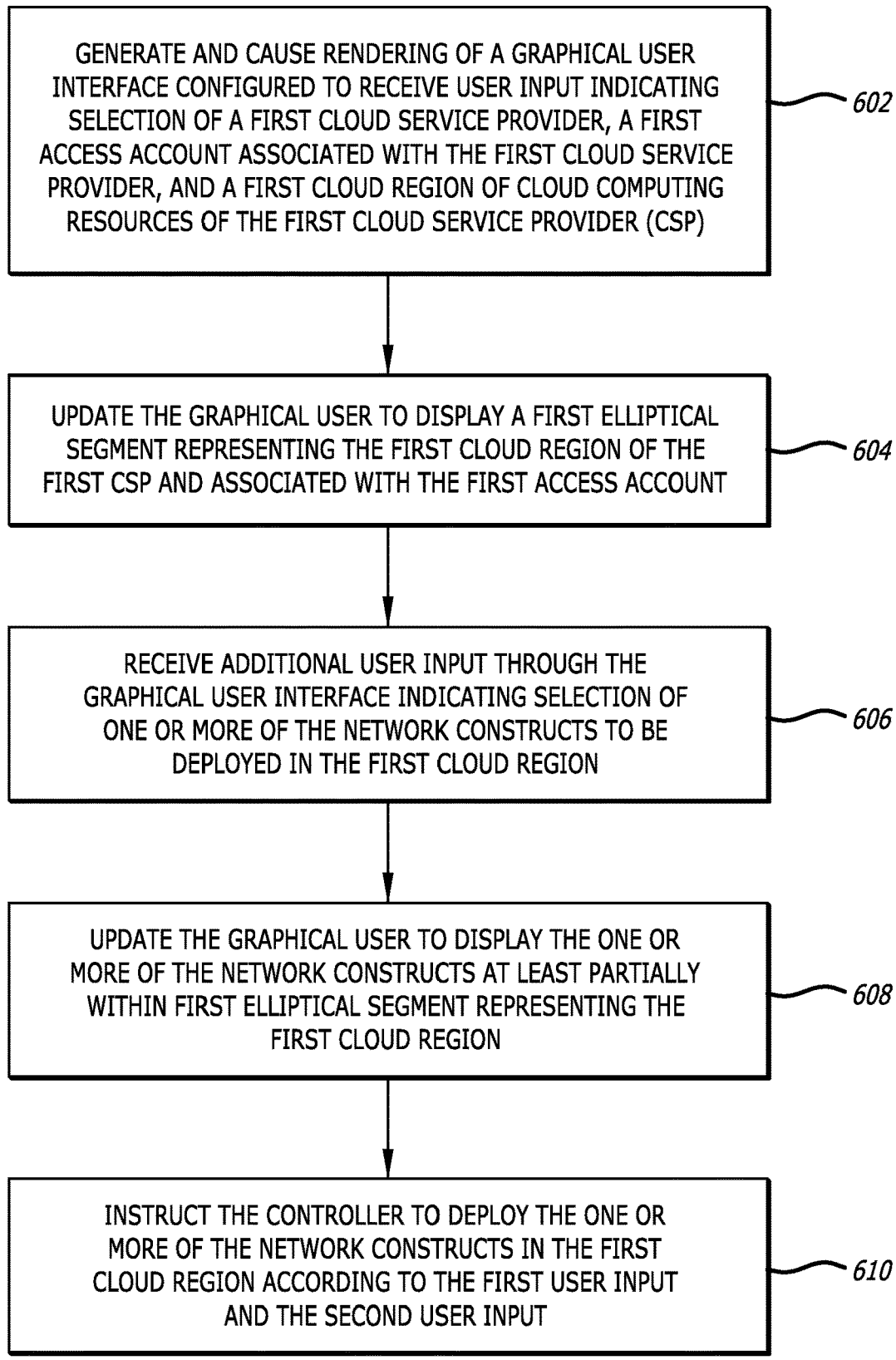

Referring now to FIG. 6, a first flowchart of an exemplary method of communications between the topology system logic, a controller and one or more network constructs deployed by the controller is shown according to some embodiments. Each block illustrated in FIG. 6 represents an operation performed in the method 600 of automatically generating a network topology by a controller in response to user input received by a graphical user interface generated by the topology system logic.

The method 600 is initiated when a topology system logic, such as the topology system logic 138 of FIG. 1, generates and causes rendering of a graphical user interface configured to receive user input indicating selection of a first cloud service provider, a first access account associated with the first cloud service provider, and a first cloud region of cloud computing resources of the first cloud service provider (block 602). As discussed above, the graphical user interface configured to receive such user input may include a display and a panel including several UI elements configured to receive specific user input (e.g., FIGS. 4A-4B).

The method 600 continues with topology system logic updating the graphical user to display a first elliptical segment representing the first cloud region of the first CSP an associated with the first access account (block 604). As illustrated in the at least FIGS. 4C-5B, an elliptical layout of a network topology graph may refer to a circular layout where the first elliptical segment may be a first circular segment (e.g., a "pie slice"). However, alternative shapes have been contemplated and are intended to be within the scope of the disclosure.

The method 600 may then receive additional user input through the graphical user interface indicating selection of one or more of the network constructs to be deployed in the first cloud region (block 606). The one or more network constructs may include, but are not limited or restricted to, transit gateways, spoke gateways, subnets, private networks (VPCs, VNETs, etc.), firewalls, etc.

The method 600 continues with topology system logic updating the graphical user to display the one or more of the network constructs at least partially within first elliptical segment representing the first cloud region (block 608). As detailed above, various icons represent the one or more of the network constructs and may be displayed within the first segment and/or on an edge of the first elliptical segment. Further, the icons placed on or within the first elliptical segment may be arranged in a tiered configuration in order to provide for ease of visualization and improve the scalability of the elliptical layout as described above.

The method 600 further includes an operation of the topology system logic instructing the controller to deploy the one or more of the network constructs in the first cloud region according to the first user input and the second user input (block 610). The topology system logic is communicatively coupled with the controller and may transmit such instructions. The generation of instructions by the topology system logic may be in response to receipt of further user input indicating an administrator desires for the network topology graph to be deployed as a fully operational network topology.

Further, additional user input may be received indicating the addition of subsequent elliptical segments to the elliptical layout. For instance, following receipt of the user input resulting in generation of the first elliptical segment discussed above and deployment of the indicated network constructs, the graphical user interface may receive subsequent user input corresponding to selection of a second CSP, a second access account and a second cloud region of cloud computing resources provided by the second CSP as well as a second set of network constructs to be deployed within the second cloud region. As a result, the topology system logic may update the elliptical layout by adding a second elliptical segment including icons representing the second set of network constructs and deploy such.

Further, the user input received by the topology system logic and the operations discussed above with respect to FIG. 6 include an indication of how each construct is communicatively coupled to other constructs (e.g., communicative coupling of gateways operating within a virtual environment (e.g., a VPC) where the coupling between gateways both operating within transit VPCs may be referred to as "transit peering" and the coupling between a gateway operating with a transit VPC and a gateway operating within a spoke VPC may be referred to as an association of the spoke gateway with the transit gateway).

In addition to the disclosure about describing the system and methods for generating a network topology graph based on user input and automatically generating a network topology by deploying network constructs within particular cloud regions of cloud computing resources provided by CSPs, the systems and methods disclosed herein also provide for monitoring a network topology through the graphical user interfaces illustrated in the drawings provided herein, e.g., FIGS. 5A-5B.

In some embodiments, a network topology may have been generated by means other than via the graphical user interfaces described herein and the graphical user interfaces are implemented for monitoring and troubleshooting purposes. The methodology of FIG. 7 provides a logical flow of operations performed by the topology system logic that enables monitoring of a network topology to be monitored by an administrator through the graphical user interfaces described herein, specifically the elliptical layout described herein.

Referring now to FIG. 7, a second flowchart of an exemplary method of communications between the topology system logic, a controller and one or more gateways managed by the controller is shown according to some embodiments. Each block illustrated in FIG. 7 represents an operation performed in the method 700 of exchanging communications with a controller and receiving data from one or more gateways managed by the controller. Prior to the initiation of the method 700, it may be assumed that a distributed cloud management system, such as that illustrated in FIG. 1, has been deployed. The method 700 is initiated when a topology system logic, such as the topology system logic 138 of FIG. 1, queries a controller, such as the controller 102 of FIG. 1 for construct metadata (block 702). As discussed above, the queries may be via one or more API calls. Subsequently, the topology system logic 138 receives the requested construct metadata and stores the received data in a database, such as the construct metadata database 220 of FIG. 2B (block 704).

Further, the topology system logic receives network data from one or more gateways that are managed by the controller (block 706). The topology system logic proceeds to store the received network data in a database, such as the network data database 222 of FIG. 2B.

Following receipt of the construct metadata and the network data, the topology system logic generates one or more visualizations based on the received data (block 708). Exemplary visualizations that may be generated are illustrated in FIGS. 4A-5B; however, the visualizations that may be generated by the topology system logic are not limited to those illustrated.

The topology system logic disclosed herein may perform additional operations such as receiving user input to tag certain aspects and/or constructs of a network topology graph and/or operations to search for and/or filter a display of a network topology graph based on tagged aspects or constructs. Additionally, the topology system logic disclosed herein may perform operations pertaining to recording a status of the network topology at time intervals and provide a replay functionality in which an administrator may compare topologies at different times in order to trouble shoot (e.g., determine what changed within a topology so as to determine a possible cause of an increase is latency values or a failure to transmit network traffic to certain constructs, etc.). Further detail regarding tagging and searching operations and replay operations is discussed in U.S. patent application Ser. No. 17/127,920, filed Dec. 18, 2020, the entire contents of which is incorporated herein.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A distributed cloud computing system, wherein the logic, upon execution by the one or more processors, causes performance of further operations including:
    a controller configured to deploy a first gateway in a first cloud computing network and a second gateway in a second cloud computing network; and
    logic, stored on non-transitory, computer-medium, that, upon execution by one or more processors, causes performance of operations including:
        obtaining, from the controller, metadata pertaining to each of the first gateway and the second gateway,
        obtaining, from each of the first gateway and the second gateway, network data, wherein a combination of the metadata and the network data identify each of a plurality of constructs, the communication paths between each construct, and in which cloud computing network each construct is deployed,
        generating an elliptical layout of a network topology graph illustrating a first segment including the first gateway representing deployment in the first cloud computing network and a second segment including the second gateway representing deployment in the second cloud computing network,
        generating a content window comprising a first listing of transit gateways that are available for establishment of transit peering with a selected transit gateway and a second listing of transit gateways to which the selected transit gateway has an established transit peering, and
        causing rendering of the visualization on a display screen of a network device.

2. The distributed cloud computing system of claim 1, wherein a first private network is communicatively coupled with the first gateway and deployed within a subnet of the first cloud computing network, and a second private network is communicatively coupled with the second gateway and deployed within a subnet of the second cloud computing network.

3. The distributed cloud computing system of claim 2, wherein the first private network and the second private network are either of a virtual private cloud (VPC) or a virtual network (VNET).

4. The distributed cloud computing system of claim 1, wherein the logic, upon execution by the one or more processors, causes performance of further operations including:
    determining a latency value of a first communication path between the first gateway and the second gateway, and wherein the visualization includes a rendering of the first communication path that provides a visual indication of the latency value.

5. The distributed cloud computing system of claim 1, wherein each construct of the plurality of constructs is one of a transit gateway, a subnet, or a private network, or a firewall.

6. A computerized method of informing a user of a network topology, the computerized method comprising:
    obtaining, from a controller, metadata pertaining to each of a first gateway and a second gateway, wherein the controller is configured to deploy the first gateway in a first cloud computing network and the second gateway in a second cloud computing network;
    obtaining, from each of the first gateway and the second gateway, network data, wherein a combination of the metadata and the network data identify each of a plurality of constructs, the communication paths between each construct, and in which cloud computing network each construct is deployed;
    generating an elliptical layout of a network topology graph illustrating a first segment including the first gateway representing deployment in the first cloud network and a second segment including the second gateway representing deployment in the second cloud computing network;
    generating a content window comprising a first listing of transit gateways that are available for establishment of transit peering with a selected transit gateway and a second listing of transit gateways to which the selected transit gateway has an established transit peering; and
    causing rendering of the visualization on a display screen of a network device.

7. The computerized method of claim 6, wherein a first private network is communicatively coupled with the first gateway and deployed within a subnet of the first cloud computing network, and a second private network is communicatively coupled with the second gateway and deployed within a subnet of the second cloud computing network.

8. The computerized method of claim 7, wherein the first private network and second private network are either of a virtual private cloud (VPC) or a virtual network (VNET).

9. The computerized method of claim 6, further comprising:
    determining a latency value of a first communication path between the first gateway and the second gateway, and wherein the visualization includes a rendering of the first communication path that provides a visual indication of the latency value.

10. The computerized method of claim 6, wherein each construct of the plurality of constructs is one of a transit gateway, a subnet, or a private network, or a firewall.

11. A non-transitory computer-readable medium having stored thereon logic that, when executed by one or more processors, causes operations including:
    obtaining, from a controller, metadata pertaining to each of a first gateway and a second gateway, wherein the controller is configured to deploy the first gateway in a first cloud computing network and the second gateway in a second cloud computing network;

obtaining, from each of the first gateway and the second gateway, network data, wherein a combination of the metadata and the network data identify each of a plurality of constructs, the communication paths between each construct, and in which cloud computing network each construct is deployed;

generating an elliptical layout of a network topology graph illustrating a first segment including the first gateway representing deployment in the first cloud network and a second segment including the second gateway representing deployment in the second cloud computing network;

generating a content window comprising a first listing of transit gateways that are available for establishment of transit peering with a selected transit gateway and a second listing of transit gateways to which the selected transit gateway has an established transit peering, and causing rendering of the visualization on a display screen of a network device.

12. The non-transitory computer-readable medium of claim 11, wherein a first private network is communicatively coupled with the first gateway and deployed within a subnet of the first cloud computing network, and a second private network is communicatively coupled with the second gateway and deployed within a subnet of the second cloud computing network, and wherein the first private network and second private network are either of a virtual private cloud (VPC) or a virtual network (VNET).

13. The non-transitory computer-readable medium of claim 11, further comprising:
 determining a latency value of a first communication path between the first gateway and the second gateway, and
 wherein the visualization includes a rendering of the first communication path that provides a visual indication of the latency value.

14. The non-transitory computer-readable medium of claim 11, wherein each construct of the plurality of constructs is one of a transit gateway, a subnet, or a private network, or a firewall.

\* \* \* \* \*